United States Patent
Lai et al.

(10) Patent No.: US 11,206,395 B2
(45) Date of Patent: Dec. 21, 2021

(54) SIGNALING QUANTIZATION MATRIX

(71) Applicant: MediaTek Inc., Hsinchu (TW)

(72) Inventors: Chen-Yen Lai, Hsinchu (TW); Olena Chubach, San Jose, CA (US); Tzu-Der Chuang, Hsinchu (TW); Ching-Yeh Chen, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 17/029,239

(22) Filed: Sep. 23, 2020

(65) Prior Publication Data
US 2021/0092361 A1 Mar. 25, 2021

Related U.S. Application Data

(60) Provisional application No. 62/904,717, filed on Sep. 24, 2019, provisional application No. 62/912,538, (Continued)

(51) Int. Cl.
*H04N 19/105* (2014.01)
*H04N 19/30* (2014.01)
(Continued)

(52) U.S. Cl.
CPC ......... *H04N 19/105* (2014.11); *H04N 19/159* (2014.11); *H04N 19/176* (2014.11); (Continued)

(58) Field of Classification Search
CPC ...... H04N 19/105; H04N 19/30; H04N 19/46; H04N 19/176; H04N 19/159; (Continued)

(56) References Cited

U.S. PATENT DOCUMENTS

2012/0121010 A1* 5/2012 Bordes ............... H04N 19/103
375/240.03
2013/0215971 A1 8/2013 Regunathan et al.
(Continued)

FOREIGN PATENT DOCUMENTS

WO WO-2018149995 A1 * 8/2018 ............. H04N 19/86
WO WO 2010121842 A1 10/2020

OTHER PUBLICATIONS

Joint Video Exploration Team (JVET) of ITU-T SG 16 WP 3 and ISO/IEC JTC 1/SC 29/WG 11 14th Meeting: Geneva, CH, Mar. 19-27, 2019, Document: JVET-N0204 (Year: 2019).*

(Continued)

*Primary Examiner* — Marnie A Matt
(74) *Attorney, Agent, or Firm* — Han IP PLLC; Andy M. Han

(57) ABSTRACT

A method for signaling scaling matrices for transform coefficient quantization is provided. A decoder receives data from a bitstream to be decoded as a current picture of a video, the current picture to be decoded by using a plurality of scaling matrices. The decoder receives a reference index offset for a first scaling matrix of the plurality of scaling matrices. The decoder applies the reference index offset to a first index identifying the first scaling matrix to derive a second index identifying a second scaling matrix of the plurality of scaling matrices. The second scaling matrix is previously reconstructed. The decoder reconstructs the first scaling matrix by referencing the second scaling matrix. The decoder dequantizes transform coefficients of transform blocks of the current picture by using the plurality of scaling matrices and reconstructs the current picture by using the dequantized transform coefficients.

13 Claims, 12 Drawing Sheets

Related U.S. Application Data filed on Oct. 8, 2019, provisional application No. 62/913,103, filed on Oct. 9, 2019, provisional application No. 62/925,267, filed on Oct. 24, 2019.

(51) Int. Cl.
  *H04N 19/46*   (2014.01)
  *H04N 19/176*  (2014.01)
  *H04N 19/159*  (2014.01)
  *H04N 19/186*  (2014.01)
  *H04N 19/70*   (2014.01)

(52) U.S. Cl.
  CPC ........... *H04N 19/186* (2014.11); *H04N 19/30* (2014.11); *H04N 19/46* (2014.11); *H04N 19/70* (2014.11)

(58) Field of Classification Search
  CPC .... H04N 19/186; H04N 19/70; H04N 19/463; H04N 19/134; H04N 19/126
  USPC ...................................................... 375/240.02
  See application file for complete search history.

(56) References Cited

U.S. PATENT DOCUMENTS

| | | | |
|---|---|---|---|
| 2014/0369408 A1* | 12/2014 | Tanaka | H04N 19/70 375/240.03 |
| 2018/0324453 A1 | 11/2018 | Cao et al. | |
| 2019/0191185 A1* | 6/2019 | Ehmann | H04N 19/157 |
| 2019/0246142 A1* | 8/2019 | Zhao | H04N 19/61 |
| 2019/0289301 A1* | 9/2019 | Lim | H04N 19/105 |
| 2020/0260116 A1* | 8/2020 | Francois | H04N 19/105 |

OTHER PUBLICATIONS

China National Intellectual Property Administration, International Search Report and Written Opinion for PCT/CN2020/117397, dated Dec. 21, 2020.

Ya Chen, Non-CE7: Use INTER quantization matrices for IBC, Joint Video Experts Team (JVET) of ITU-T SG 16 WP 3 and ISO/IEC JTC 1/SC 29/WG 11 15th Meeting, Gothenburg, Sweden, JVET-O0527, Jul. 3-12, 2019.

* cited by examiner

*FIG. 1*

SIGNALING QUANTIZATION MATRIX

CROSS REFERENCE TO RELATED PATENT APPLICATION(S)

The present disclosure is part of a non-provisional application that claims the priority benefit of U.S. Provisional Patent Applications No. 62/904,717, No. 62/912,538, No. 62/913,103, and No. 62/925,267 filed on 24 Sep. 2019, 8 Oct. 2019, 9 Oct. 2019, and 24 Oct. 2019, respectively. Contents of above-listed applications are herein incorporated by reference.

TECHNICAL FIELD

The present disclosure relates generally to video coding. In particular, the present disclosure relates to methods of signaling and processing quantization matrices.

BACKGROUND

Unless otherwise indicated herein, approaches described in this section are not prior art to the claims listed below and are not admitted as prior art by inclusion in this section.

The quantization matrix (QM) has been used in various video coding standards. Block-based hybrid video coding schemes which imply transform coding of the residual signal use frequency dependent scaling to control the distribution of the quantization distortion across different frequencies in a transform unit (TU). In order to achieve perceptually uniform quantization across spatial frequencies, a quantization matrix weights each frequency channel associated with the transform coefficient according to the perceived sensitivity over its related frequency range such that lower frequency coefficients in the transform block are quantized in finer quantization step sizes than higher frequency coefficients. At the decoder, a corresponding quantization matrix inversely weighs the de-quantized transform coefficients of each frequency channel. Quantization matrix has been successfully utilized in various video coding standards, such as H.264/AVC (Advanced Video Coding) and H.265/HEVC (High Efficiency Video Coding) and in numerous commercial products, in order to improve the subjective quality of video content.

For H.265/HEVC, depending on the size and type of the transform block, the following quantization matrices are supported. Luma: Intra4×4, Inter4×4, Intra8×8, Inter8×8, Intra16×16, Inter16×16, Intra32×32, Inter32×32. Cb: Intra4×4, Inter4×4, Intra8×8, Inter8×8, Intra16×16, Inter16× 16. Cr: Intra4×4, Inter4×4, Intra8×8, Inter8×8, Intra16×16, Inter16×16.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method for signaling scaling matrices for transform coefficient quantization. A decoder receives data from a bitstream to be decoded as a current picture of a video, the current picture to be decoded by using a plurality of scaling matrices. The decoder receives a reference index offset for a first scaling matrix of the plurality of scaling matrices. The decoder applies the reference index offset to a first index identifying the first scaling matrix to derive a second index identifying a second scaling matrix of the plurality of scaling matrices. The second scaling matrix is previously reconstructed. The decoder reconstructs the first scaling matrix by referencing the second scaling matrix. The decoder dequantizes transform coefficients of transform blocks of the current picture by using the plurality of scaling matrices and reconstructs the current picture by using the dequantized transform coefficients.

In some embodiments, when a first flag in the bitstream indicates that corresponding elements of the first and second scaling matrices are identical, the first scaling matrix is determined by replicating the elements of the second scaling matrix as the elements of the first scaling matrix. In some embodiments, when the first flag in the bitstream indicates that corresponding elements of the first and second scaling matrices are not identical, a second flag in the bitstream indicates whether the first scaling matrix is determined by (i) adding a set of delta values to the elements of the second scaling matrix as elements of the first scaling matrix or (ii) explicit signaling in the bitstream.

In some embodiments, the first and second indices are assigned to the first and second scaling matrices respectively according to a one-dimensional indexing scheme that assigns indices to scaling matrices according to their color components, block sizes, and prediction types. In some embodiments, scaling matrices for coding 2×2 transform blocks of chroma components for intra prediction type are not assigned indices according to the one-dimensional indexing scheme. In some embodiments, when no other scaling matrix of a same particular size as the first scaling matrix has been previously signaled for the current picture, the reference index offset is not signaled in the bitstream and the first scaling matrix is determined by referencing a default quantization matrix. In some embodiments, when the first index is greater than a threshold, the block size of the scaling matrix is 64.

In some embodiments, the bitstream includes a first syntax element that specifies a difference between two consecutive scaling matrix coefficients in the first matrix and a second syntax element that specifies a DC coefficient of the first scaling matrix. The first and second syntax elements are constrained to be between −128 and 127, inclusive.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 1 illustrates the content of default quantization matrices of sizes 4×4 and 8×8 having default values.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Quantization Matrices

Figure 1:
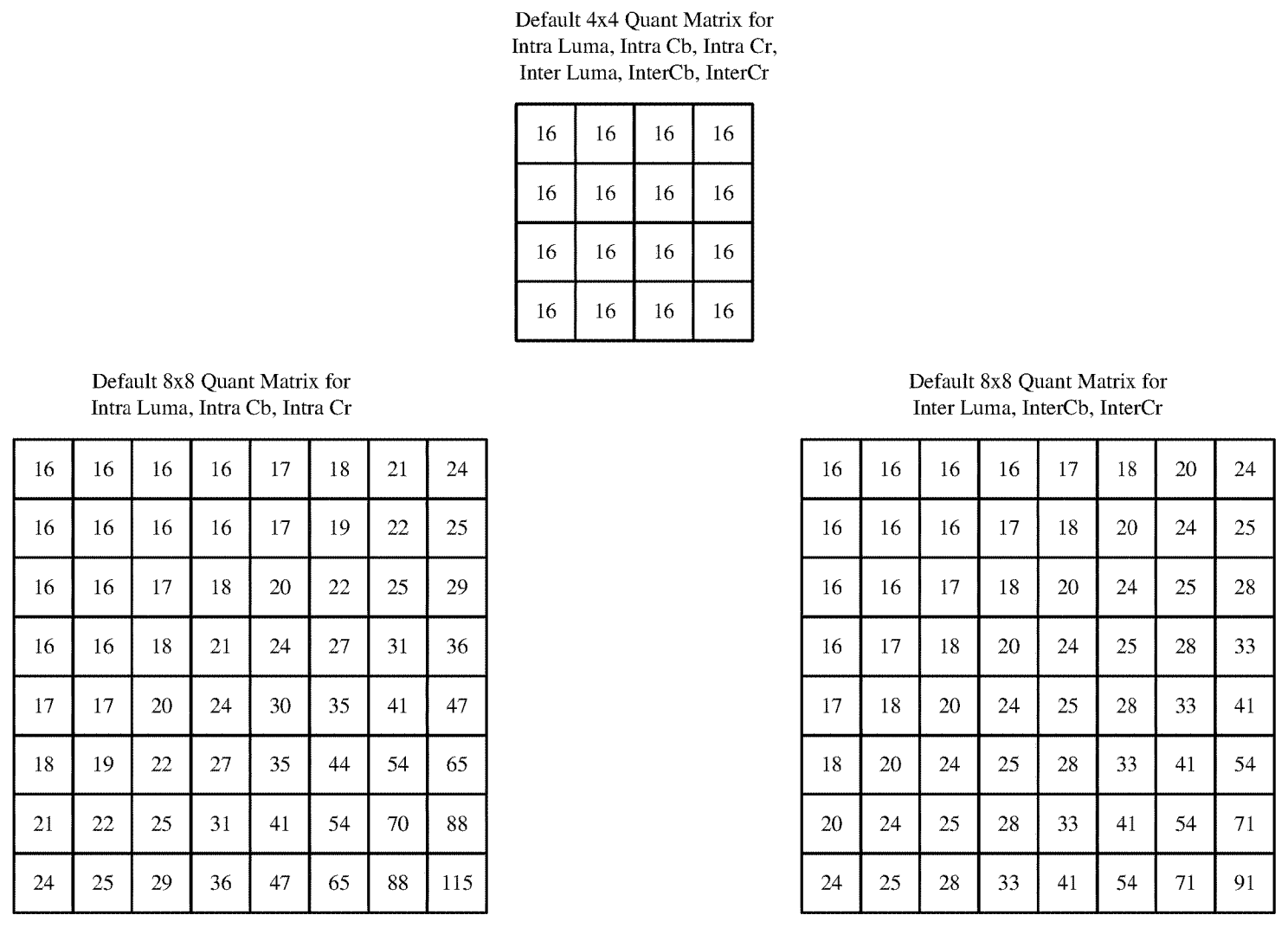

Some embodiments of the disclosure provide methods for signaling or representing quantization matrices. Quantization matrices are used for achieving frequency dependent scaling. Consequently, quantization matrices (QMs) may also be referred to as scaling matrices, scaling lists, or scaling list matrices. For HEVC, frequency dependent scaling can be enabled by using the syntax element scaling_list_enabled_flag in sequence parameter sets (SPS). When this flag is enabled, additional flags in SPS and picture parameter sets (PPS) control whether the default quantization matrices or non-default quantization matrices are used. For some embodiments, FIG. 1 illustrates the content of default quantization matrices of sizes 4×4 and 8×8 having default values. In some embodiments, non-default quantization matrices can be optionally transmitted in the bitstream in SPS or PPS.

In order to reduce the memory needed to store the quantization matrices, 8×8 matrices are used to derive quantization matrices of larger transform blocks (e.g., 16×16, 32×32, 64×64, etc.). Thus, the 8×8 default quantization matrices are called base scaling matrices. For example, the quantization matrices for transform blocks of sizes 16×16 and 32×32 are obtained from the 8×8 base scaling matrices of the same type by up-sampling using replication.

Figure 2:
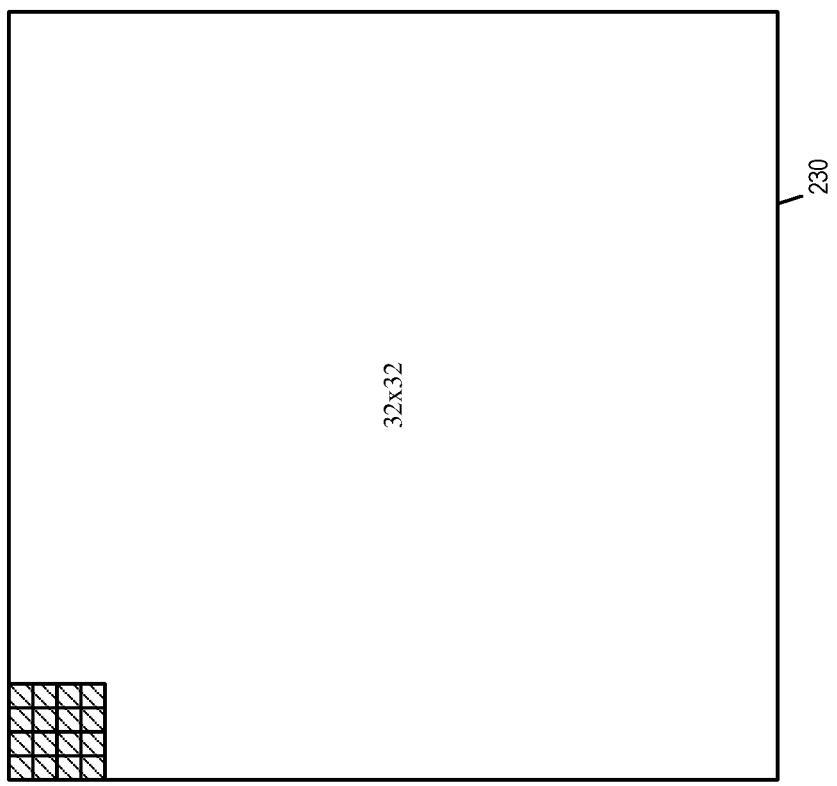
FIG. 2 illustrates up-sampling a base scaling matrix (8×8 quantization matrix) to derive quantization matrices of larger blocks.
Figure 2:
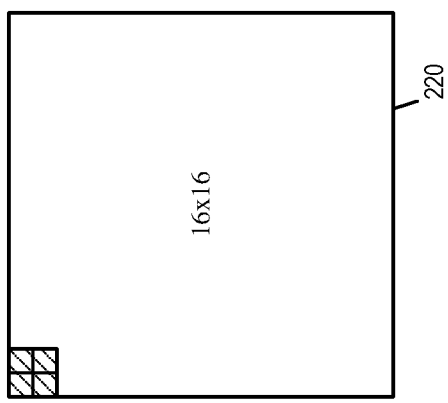
Figure 2:
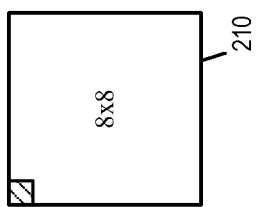

FIG. 2 illustrates up-sampling a base scaling matrix (8×8 quantization matrix) to derive quantization matrices of larger blocks. As illustrated, a 1×1 region of an 8×8 quantization matrix 210 is up-sampled into a 2×2 region in a 16×16 quantization matrix 220 and a 4×4 region in a 32×32 quantization matrix 230.

A. Quantization Matrices for Small Blocks

In some embodiments, scaling lists for 2×2 TUs are disabled. In some embodiments, default matrices (i.e. flat matrices) are always used for 2×2 TUs. In some embodiments, scaling lists for 2×2 TUs can be derived from other scaling lists, e.g., scaling lists for 4×4 or 8×8 TUs. For example, the scaling lists for 2×2 can be derived from 4×4 scaling lists by down-samples, or directly used the top-left 2×2 from 4×4 scaling lists. In the above cases, 2×2 scaling lists are not signaled.

For some video coding standards, the smallest chroma CB is 2×2. This smallest CB is generated by sub-block transform (SBT) and may cause low hardware processing throughput. For some embodiments, in order to remove 2×2 blocks, some constraints are applied to sub-block transform (SBT). In some embodiments, the maximum luma CB size of SBT is constrained to e.g., 64×64 or 32×32. In some embodiments, for small CBs, SBT is constrained to be enabled only when the CB width or height is larger than or equal to 8 (e.g., a 8×4 luma CB is allowed for SBT). When vertical split is applied, a 4×4 luma CB is generated along with and 2×2 chroma CBs. In some embodiments, for small blocks, SBT can only be applied when both luma CB width and height are larger than 8. In some embodiments, SBT can only be applied when luma CB size is larger than 64. In some embodiments, if the luma TB size becomes 4×4 after applying SBT to one CU, then the SBT is forbidden.

In one embodiment, 2×2 inter scaling lists for chroma are signaled, while 2×2 intra scaling lists for chroma are not signaled. For sizes 4×4 through 32×32, scaling lists of different combinations of inter/intra and luma/chroma are signaled.

B. One Dimensional Indexing of Scaling Matrices

In some embodiments, when signaling a scaling matrix, an identifier of the size of the matrix (sizeId) and an identifier of the matrix (matrixId) itself are signaled independently in a two-dimensional scheme. In some other embodiments, a one-dimensional (1D) indexing scheme is used for specifying scaling matrices. For example, in some embodiments, a linear sequence of indices may be assigned to scaling matrices of different types, e.g., from smaller TB sizes to larger TB sizes. Furthermore, for each TB size, the scaling matrices for different prediction modes (e.g., inter mode, intra mode, intra block copy mode, etc.), different color components (Y,U,V) are assigned indices in an interleaved, sequential order.

Figure 3:
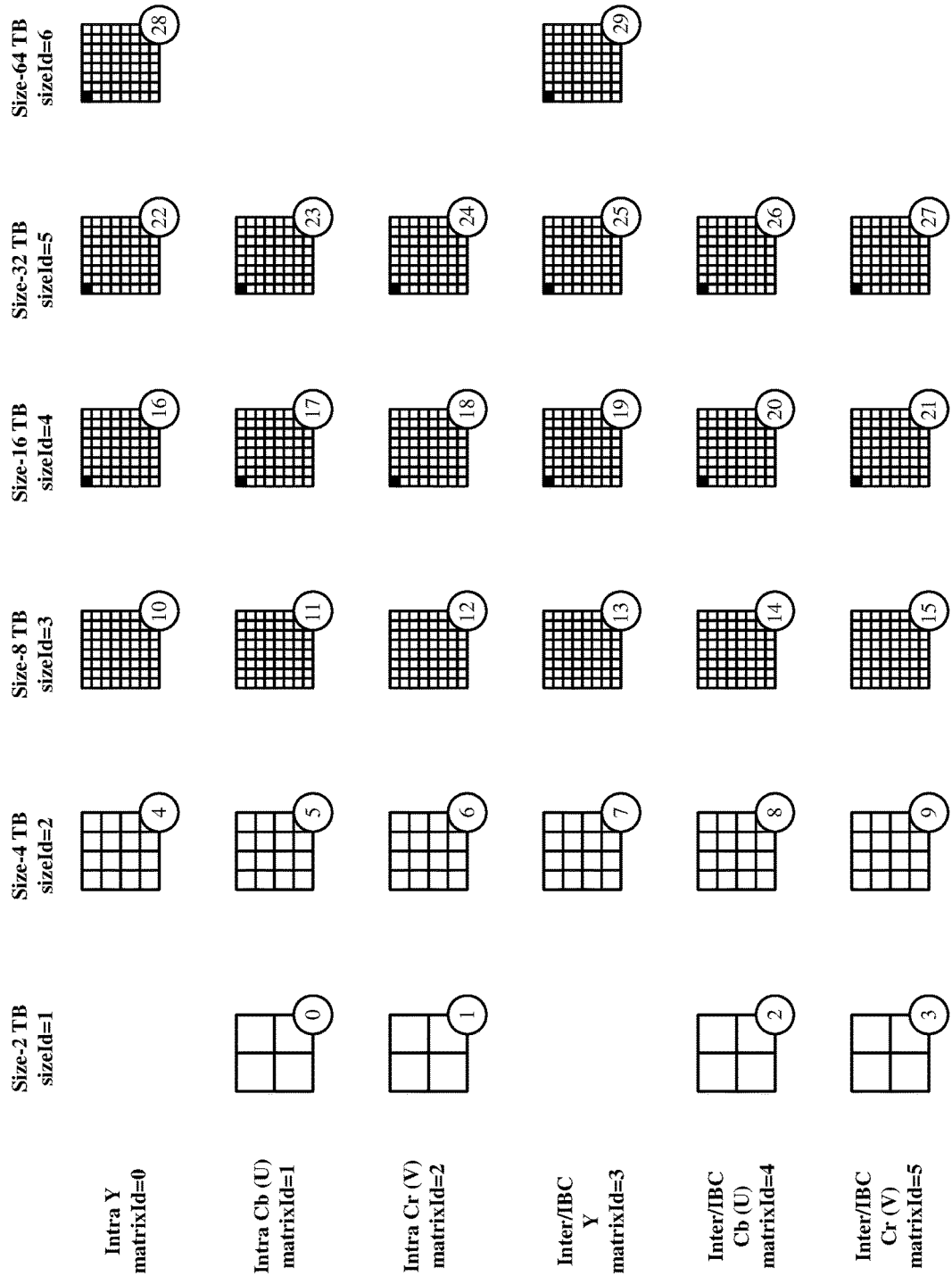
FIG. 3 shows an example 1D indexing scheme for identifying scaling matrices of different sizes, different color components, and different prediction modes.

FIG. 3 shows an example 1D indexing scheme for identifying scaling matrices of different sizes, different color components, and different prediction modes. In the illustrated 1D indexing scheme, scaling matrices are not coded for luma blocks with sizeId=2. Table 1 below shows example syntax for signaling scaling lists of a video picture or sequence based on the 1D indexing scheme.

TABLE 1

| | Descriptor |
|---|---|
| ```
scaling_list_data( ) {
  for( scalingListId = 0; scalingListId < 30; scalingListId ++ ) {
    matrixSize = (scalingListId < 4 ) ? 2: (scalingListId < 10) ? 4 : 8
    scaling_list_copy_mode_flag [ scalingListId ]
    if( !scaling_list_copy_mode_flag [ scalingListId ] )
        scaling_list_prediction_mode_flag [ scalingListId ]
    if( ( scaling_list_copy_mode_flag [ scalingListId ] ||
        scaling_list_prediction_mode_flag [ scalingListId ] )
        && scalingListId != 0 && scalingListId != 4 && scalingListId !=10 )
        {
        scaling_list_pred_scaling_list_id_delta [ scalingListId ]
    if( !scaling_list_copy_mode_flag [ scalingListId ]){
      nextCoef = (scaling_list_prediction_mode_flag_scalingListId ] ) ? 0 : 8
      if( scalingListId > 15 ) {
        scaling_list_dc_coef [ scalingListId ]
        nextCoef = scaling_list_dc_coef [ scalingListId ] + nextCoef
      }
      for( i = 0; i < matrixSize * matrixSize; i++ ) {
        x = DiagScanOrder[ 3 ][ 3 ][ i ][ 0 ]
        y = DiagScanOrder[ 3 ][ 3 ][ i ][ 1 ]
        if( !( matrixId > 27 && x >= 4 && y >= 4) ) {
          scaling_list_delta_coef
          nextCoef = ( nextCoef + scaling_list_delta_coef + 256 ) % 256
          ScalingList[ scalingListId ][ i ] = nextCoef
        }
      }
    }
  }
}
``` | u(1)<br><br>u(1)<br><br><br><br>ue(v)<br><br><br>se(v)<br><br><br><br><br><br><br>se(v) |

The variable "scalingListId" is the index of the scaling list or scaling matrix being signaled (also referred to as the current or target scaling list or matrix) according to the 1D indexing scheme.

The syntax element scaling_list_copy_mode_flag[scalingListId] being 1 specifies that the values of the scaling list are the same as the values of a reference scaling list. The reference scaling list is specified by using syntax element scaling_list_pred_scaling_list_id_delta[scalingListId]. The syntax element scaling_list_copy_mode_flag[scalingListId] being 0 specifies that the values of the scaling list are explicitly signaled.

The syntax element scaling_list_prediction_mode_flag [scalingListId] being 1 specifies that the values of the scaling list can be predicted from a reference scaling list. The reference scaling list is specified by scaling_list_pred_scaling_list_id_delta[scalingListId]. The syntax element scaling_list_prediction_mode_flag[scalingListId] being 0 specifies that the values of the scaling list are explicitly signaled. When not present, the value of scaling_list_prediction_mode_flag[scalingListId] is inferred to be equal to 0.

The syntax element scaling_list_pred_scaling_list_id_delta [scalingListId] is used to specifies or identifies the reference scaling list used to derive the current scaling list ScalingList[scalingListId]. The index of the reference scaling list, denoted as refScalingListId, can be derived using the index of the current scaling list scalingListId and scaling_list_pred_scaling_list_id_delta. For example, the index of the reference scaling list may be set according to:

refScalingListId =
  scalingListId - scaling_list_pred_scaling_list_id_delta[scalingListId].

In other words, scaling_list_predi_scaling_list_id_delta [scalingListId] is the offset from the index of the current scaling list to the index of the reference scaling list. This offset is also referred to as the reference index offset for the current scaling list.

In some embodiments, when the scalingListId is smaller than 4, the value of scaling_list_pred_scaling_list_id_delta [scalingListId] is in the range of 0 to scalingListId, inclusive; when the scalingListId is in the range of 4 to 9, the value of scaling_list_pred_scaling_list_id_delta [scalingListId] is in the range of 0 to scalingListId−4, inclusive; when the scalingListId is larger than 9, the value of scaling_list_pred_scaling_list_id_delta[scalingListId] is in the range of 0 to scalingListId−10, inclusive.

In some embodiments, when scaling_list_copy_mode_flag[ scalingListId] is equal to 1 (or when scaling_list_pred_mode_flag[ scalilngListId] is equal to 0), ScalingMatrix[sizeId][matrixId][x][y] according to the following:

with x=0..(1<< matrixSize)−1, y=0..(1<< matrixSize)−1,
If scaling_list_pred_scaling_list_id_delta[ matrixId ] is equal to 0,
ScalingMatrix[sizeId][ matrixId ][x][y] is inferred to be 16.

Otherwise, the scaling list ScalingMatrix[sizeId][matrixId][x][y] is inferred from (e.g., set equal to) the reference scaling list ScalingMatrix[refSizeId][refMatrxId] [x][y].

In some embodiments, a scaling matrix having a different base size than the current scaling matrix cannot be used as the reference scaling matrix. For example, when the current scaling matrix has its scalingListId equal to 0, 4, or 10, (which are the first scaling matrices in each base size as shown in FIG. 3), a default quantization matrix (as shown in FIG. 1) is inferred as the reference matrix, and the syntax element scaling_list_pred_scaling_list_id_delta is skipped.

Furthermore, since each scaling list matrix is only allowed to reference the matrix with the same base size, a value constraint can be applied to the offset value scaling_list_pred_scaling_list_id_delta. For example, when the scalingListId is smaller than 4, the value of scaling_list_pred_scaling_list_id_delta [scalingListId] is constrained to be in the range of 0 to scalingListId, inclusive.

When the scalingListId is in the range of 4 to 9, the value of scaling_list_pred_scaling_list_id_delta [scalingListId] is constrained to be in the range of 0 to scalingListId−4, inclusive. When the scalingListId is larger than 9, the value of scaling_list_pred_scaling_list_id_delta[scalingListId] is constrained to be in the range of 0 to scalingListId−10, inclusive. Therefore, for example, a scaling list with Id=13, which is in the range of greater than 9, can reference previously decoded scaling lists with Id=10 through Id=12, in addition to referencing default scaling list.

For a target scaling list index (scalingListID in 1D scheme), the size index and matrix index (sizeId and matrixId in 2D scheme) can be derived by a look up table or a formula. The value of sizeId and matrixId are derived based on scalingListId by Table 2. The value of refSizeId and refMatrixId may also be derived based on refScalingListId by using Table 2.

TABLE 2

| scalingListId | 0 | 1 | 2 | 3 | 4 | 5 | 6 | 7 | 8 | 9 |
|---|---|---|---|---|---|---|---|---|---|---|
| sizeId | 1 | 1 | 1 | 1 | 2 | 2 | 2 | 2 | 2 | 2 |
| matrixId | 1 | 2 | 4 | 5 | 0 | 1 | 2 | 3 | 4 | 5 |
| scalingListId | 10 | 11 | 12 | 13 | 14 | 15 | 16 | 17 | 18 | 19 |
| sizeId | 3 | 3 | 3 | 3 | 3 | 3 | 4 | 4 | 4 | 4 |
| matrixId | 0 | 1 | 2 | 3 | 4 | 5 | 0 | 1 | 2 | 3 |
| scalingListId | 20 | 21 | 22 | 23 | 24 | 25 | 26 | 27 | 28 | 29 |
| sizeId | 4 | 4 | 5 | 5 | 5 | 5 | 5 | 5 | 6 | 6 |
| matrixId | 4 | 5 | 0 | 1 | 2 | 3 | 4 | 5 | 0 | 3 |

Tables 3A shows specification of sizeId based on size of quantization matrix/scaling list.

TABLE 3A

| Size of QM | sizeId |
|---|---|
| 1×1 | 0 |
| 2×2 | 1 |
| 4×4 | 2 |
| 8×8 | 3 |
| 16×16 | 4 |
| 32×32 | 5 |
| 64×64 | 6 |

Table 3B shows specification of matrixId according to prediction mode and color component.

TABLE 3B

| CuPredMode | cIdx (Colour component) | matrixId |
|---|---|---|
| MODE_INTRA | 0 (Y) | 0 |
| MODE_INTRA | 1 (Cb) | 1 |
| MODE_INTRA | 2 (Cr) | 2 |
| MODE_INTER, MODE_IBC | 0 (Y) | 3 |
| MODE_INTER, MODE_IBC | 1 (Cb) | 4 |
| MODE_INTER, MODE_IBC | 2 (Cr) | 5 |

The syntax element scaling_list_dc_coef[scalingListId]+predDC specifies the value of ScalingFactorDC[sizeId][matrixId] (the DC value of the scaling list identified by scalingListId). In some embodiments, the value of ScalingFactorDC[sizeId][matrixId] is constrained to be in the range of 1 to 255, inclusive. If scaling_list_prediction_mode_flag[scalingListId] is equal to 1, and scaling_list_pred_scaling_list_id_delta[scalingListId] is equal to 0, predDC is equal to 16; otherwise, if scaling_list_prediction_mode_flag[matrixId] is equal to 1, predDC is equal to ScalingMatrix[refSizeId][refMatrixId][0][0]; otherwise, predDC is equal to 8. If scaling_list_copy_mode_flag[scalingListId] is equal to 1, scalingListId is larger than 15, and scaling_list_pred_scaling_list_id_delta [scalingListId] is equal to 0, the value of ScalingFactorDC[sizeId][matrixId] is set as 16. Otherwise, if scaling_list_copy_mode_flag [scalingListId] is equal to 1, scalingListId is larger than 15, and scaling_list_pred_scaling_list_id_delta [scalingListId] is not equal to 0, the value of ScalingFactorDC[sizeId][matrixId] is set equal to ScalingFactorDC[refSizeId][refMatrixId].

The syntax element scaling_list_delta_coef specifies the difference between the current matrix coefficient ScalingList[scalingListId][i] and the previous matrix coefficient ScalingList[scalingListId][i−1], when scaling_list_copy_mode_flag[scalingListId] is equal to 0. In some embodiments, the value of scaling_list_delta_coef is constrained to be in the range of −128 to 127, inclusive. The value of ScalingList[scalingListId][i] shall be greater than 0. When scaling_list_copy_mode_flag[scalingListId] is equal to 0 and scaling_list_delta_coef is not present, the value of ScalingList[scalingListId][i] is inferred to be 0.

If scaling_list_copy_mode_flag[scalingListId] is equal to 0, the array ScalingMatrix[scalingListId] (or ScalingMatrix[sizeId][matrixId]) is derived as follows:

```
ScalingMatrix[sizeId][ matrixId ][ i ][ j ] =
  ScalingList[scalingListId][ k ] +
(scaling_list_prediction_mode_flag[ scalingListId ]) ?
  ((scaling_list_pred_scaling_list_id_delta[scalingListId] == 0) ? 16 :
    ScalingList[ refScalingListId ][ i ]) : 0
  with k = 0 .. (matrixSize* matrixSize − 1),
  i = diagScanOrder[ sizeId ][ sizeId ][ k ][ 0 ], and
  j = diagScanOrder[ sizeId ][ sizeId ][ k ][ 1 ]
```

When ChromaArrayType is equal to 3, the elements of the chroma quantization matrix of size 64×64, ScalingMatrix[6][6][matrixId][x][y], x=0 . . . 7, y=0 . . . 7, and matrixId=1, 2, 4 and 5 are derived as follows:

```
ScalingMatrix [6][6][matrixId][x][y] =
  ScalingMatrix [5][5][ matrixId ][ i ][ j ]
  with i = x and j = y
```

The variable ScalingFactor is a five-dimensional array. Specifically, ScalingFactor[wId][hId][matrixId][x][y] specifies the array of scaling factors according to following: (the variables matrixId specified in Table 3B)

```
for x ranging from 0 to (1<<wId) - 1, and y ranging
    from 0 to (1<<hId) -
1, wId=0..6, hId=0..6,
    ScalingFactor[wId][hId][matrixId][x][y] =
    ScalingMatrix[sizeLId][ matrixId ][ i ][ j ]
If wId is not equal to hId, sizeLId = max(wId, hId),
    i = (x << ( (sizeLId>3) ? 3 : sizeLId) >>wId ),
    j = (y << ( (sizeLId>3) ? 3 : sizeLId) >>hId )
Otherwise (wId is equal to hId), sizeLId = wId, i=x, j=y
If the max( wId, hId ) is larger than 3, the following
    applies.
    ScalingFactor[wId][hId][matrixId][0][0] =
    ScalingFactorDC[ max( wId, hId )][ matrixId ]
```

Figure 4:
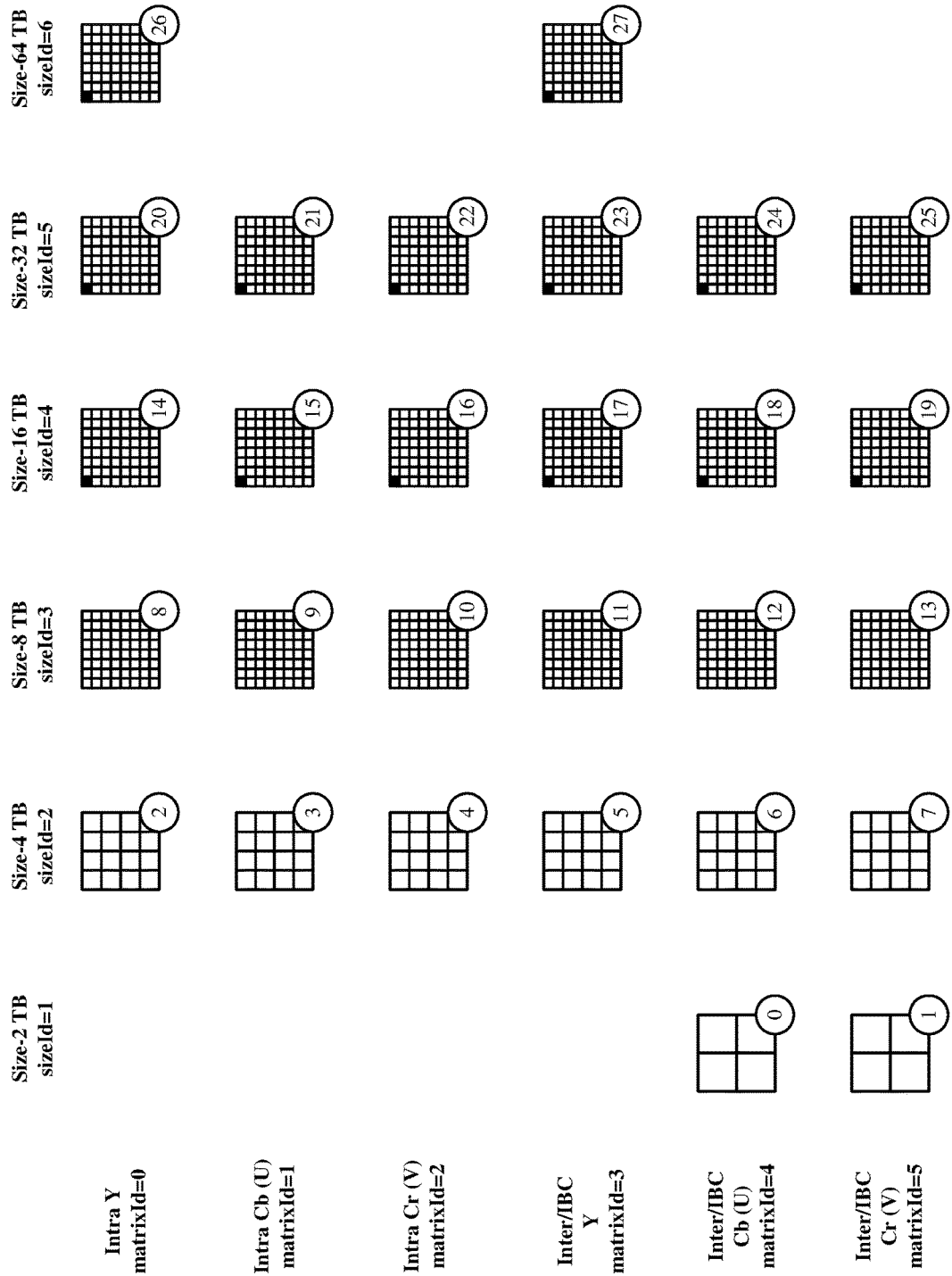
FIG. 4 shows a 1D indexing scheme for identifying scaling matrices of different sizes, different color components, and different prediction modes, in which 2×2 chroma is removed from 1D scaling matrices indexing.

In some embodiments, the intra 2×2 chroma (scaling) matrix can be removed (from the 1D indexing scheme). FIG. 4 shows a 1D indexing scheme for identifying scaling matrices of different sizes, different color components, and different prediction modes, in which 2×2 chroma is removed from 1D scaling matrices indexing. As illustrated, the first index, index 0, correspond to a scaling list for 2×2 inter chroma component, while 2×2 intra chroma components are omitted from this indexing scheme.

Table 4 below shows syntax for signaling scaling lists of a video picture or sequence when scaling lists of intra 2×2 chroma are omitted from the 1D indexing scheme.

TABLE 4

|  | Descriptor |
|---|---|
| scaling_list_data( ) { | |
|   for( scalingListId = 0; scalingListId < 28; scalingListId ++ ) { | |
|     matrixSize = (scalingListId < 2 ) ? 2 : (scalingListId < 8 ) ? 4 : 8 | |
|     scaling_list_copy_mode_flag [ scalingListId ] | u(1) |
|     if( !scaling_list_copy_mode_flag [ scalingListId ] ) | |
|       scaling_list_prediction_mode_flag [ scalingListId ] | u(1) |
|     if( ( scaling_list_copy_mode_flag [ scalingListId ] \|\| | |
|       scaling_list_prediction_mode_flag [ scalingListId ] ) | |
|       && scalingListId != 0 && scalingListId != 2 && | |
|       scalingListId !=8 ) { | |
|       scaling_list_pred_scaling_list_id_delta[ scalingListId ] | ue(v) |
|     if( !scaling_list_copy_mode_flag [ scalingListId ]){ | |
|       nextCoef = (scaling_list_prediction_mode_flag [scalingListId ]) ? 0 : 8 | |
|       if( scalingListId > 13 ) { | |
|         scaling_list_dc_coef [ scalingListId ] | se(v) |
|         nextCoef = scaling_list_dc_coef [ scalingListId ] + nextCoef | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( matrixId > 25 && x >= 4 && y >= 4) ) { | |
|           scaling_list_delta_coef | se(v) |
|           nextCoef = ( nextCoef + scaling_list_delta_coef + 256 ) % 256 | |
|           ScalingList[ scalingListId ][ i ] = nextCoef | |
|         } | |
|       } | |
|     } | |
|   } | |
| } | |

When 2×2 chroma is removed from 1D indexing, the mapping between the values of scalingListId (1D indexing) versus sizeId and matrixId (2D indexing) are modified according to Table 5 below:

TABLE 5

| scalingListId | 0 | 1 | 2 | 3 | 4 | 5 | 6 | 7 | 8 | 9 |
|---|---|---|---|---|---|---|---|---|---|---|
| sizeId | 1 | 1 | 2 | 2 | 2 | 2 | 2 | 2 | 3 | 3 |
| matrixId | 4 | 5 | 0 | 1 | 2 | 3 | 4 | 5 | 0 | 1 |
| scalingListId | 10 | 11 | 12 | 13 | 14 | 15 | 16 | 17 | 18 | 19 |
| sizeId | 3 | 3 | 3 | 3 | 4 | 4 | 4 | 4 | 4 | 4 |
| matrixId | 2 | 3 | 4 | 5 | 0 | 1 | 2 | 3 | 4 | 5 |
| scalingListId | 20 | 21 | 22 | 23 | 24 | 25 | 26 | 27 | | |
| sizeId | 5 | 5 | 5 | 5 | 5 | 5 | 6 | 6 | | |
| matrixId | 0 | 1 | 2 | 3 | 4 | 5 | 0 | 3 | | |

When intra 2×2 chroma is removed from the 1D indexing scheme, the syntax element scaling_list_pred_scaling_list_id_delta [scalingListId] is defined differently than when intra 2×2 chroma is in the 1D indexing scheme. Specifically, when the scalingListId is smaller than 2, the value of scaling_list_pred_scaling_list_id_delta [scalingListId] is in the range of 0 to scalingListId, inclusive. When the scalingListId is in the range of 2 to 7, the value of scaling_list_pred_scaling_list_id_delta [scalingListId] is in the range of 0 to scalingListId−2, inclusive. When the scalingListId is larger than 7, the value of scaling_list_pred_scaling_list_id_delta[scalingListId] is in the range of 0 to scalingListId−8, inclusive.

C. Scaling List Predictor

A value can be used to predict the first coefficient in a scaling list (named starting point predictor). In one embodiment, the starting point predictor can be a predefined value, ex. 0, 8, or 16. In another embodiment, the starting point predictor can be a value dependent on the matrix-predicting mode, e.g. copy mode (current scaling matrix being signaled is exactly the same as a previously signaled scaling matrix), DPCM mode (directly signal every coefficients in the scaling list), or predictor mode (a previously signaled scaling list is used as a predictor or reference; the differences between predictor and current scaling matrix, and the index of the predictor need to be signaled). In another embodiment, the starting point predictor can be a value dependent on the internal bit-depth. In another embodiment, the starting point predictor can be a value dependent on the color component, e.g. Y, Cb, or Cr. In another embodiment, the starting point predictor can be a value dependent on the predicting mode, e.g. Inter, intra, IBC.

The predictor mode (or matrix-predicting mode) may also reference a default scaling list (e.g., the default quantization matrices of FIG. 1, or a matrix with uniform or flat values) to perform the prediction. In some embodiments, a reference matrix index (an index that identifies the predictor/reference scaling matrix in the 1D scheme) can be used to indicate whether the default scaling list is used to predict current scaling list or not. If the reference matrix index is equal to the current matrix index (an index that identifies the current scaling list in the 1D scheme), the default scaling list is used as the predictor to predict the current scaling list. In some embodiments, a flag that indicates whether the predictor mode is applied or not can be omitted. In some embodiments, only copy mode and predictor mode are used to code or signal the scaling lists, and the reference matrix index is used to indicate whether the default scaling list is used to predict the current scaling list or not. DPCM may be applied to code or signal the difference values between predictor (reference scaling matrix) and the current scaling list.

In Table 1 and Table 4, scaling_list_copy_mode_flag and scaling_list_prediction_mode_flag (and in Table 6 below, scaling_list_pred_mode_flag and scaling_list_predictor_mode_flag) are used to indicate whether the current scaling matrix is copied from a reference scaling matrix, or whether the current scaling matrix can be predicted from either previously decoded or default reference scaling matrix with additional element-to-element differences. If the current scaling matrix is copied or predicted from an already signaled or coded reference scaling matrix, a syntax element scaling_list_pred_scaling_list_id_delta is signaled to indicate which scaling matrix is used.

In some embodiments, a scalingListId that is larger than a threshold or is smaller than a threshold indicates that the current scaling list is for 64×64/64×N/N×64 block size. In some embodiments, the threshold is 27. In some embodiments, the threshold is 23. In some embodiments, the bottom-right samples of the current scaling list are not signaled because of coefficient zero-out.

D. Alternate Scaling List Syntax

In some embodiments, a different set of syntax elements are used to signal scaling lists (scaling or quantization matrices) in a one-dimensional indexing scheme. For example, the syntax element "scaling_list_copy_mode_flag" may be replaced by "scaling_list_pred_mode_flag" for signaling whether the values of the current scaling list are the same as the values of a reference scaling list; the syntax element "scaling_list_prediction_mode_flag" may be replaced by "scaling_list_predictor_mode_flag" for signaling whether the values of the current scaling list can be predicted from a reference scaling list or are explicitly signaled. Table 6 below shows example syntax for signaling scaling lists of a video picture or sequence based on the 1D indexing scheme using alternate syntax.

TABLE 6

| | Descriptor |
|---|---|
| scaling_list_data( ) { | |
|   for( scalingListId = 0; scalingListId < 30; scalingListId ++ ) { | |
|     matrixSize = ( matrixId < 4 ) ? 2 : ( matrixId < 10 ) ? 4 : 8 | |
|     scaling_list_pred_mode_flag [ scalingListId] | u(1) |
|     if( !scaling_list_pred_mode_flag [ scalingListId ] ) | |
|       scaling_list_predictor_mode_flag [ scalingListId ] | u(1) |
|     if( (!scaling_list_pred_mode_flag [ scalingListId ] \|\| | |
|       scaling_list_predictor_mode_flag [ scalingListId ]) | |
|       && | |
|       scalingListId != 0 && scalingListId != 4 && | |
|       scalingListId !=10) { | |
|       scaling_list_pred_scaling_list_id_delta[ scalingListId ] | ue(v) |
|     if( scaling_list_pred_mode_flag [ scalingListId ]){ | |
|       nextCoef = 8 | |
|       if( scalingListId > 15 ) { | |
|         scaling_list_dc_coef_minus8 [ scalingListId ] | se(v) |
|         nextCoef = scaling_list_dc_coef_minus8 [scalingListId ] + 8 | |
|       } | |
|       for( i = 0; i < (1<<(matrixSize << 1)); i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( matrixId > 27 && x >= 4 && y >= 4) ) { | |
|           scaling_list_delta_coef | se(v) |
|           nextCoef = ( nextCoef + scaling_list_delta_coef + 256 ) % 256 | |
|           ScalingList [ scalingListId ][ i ] = nextCoef | |
|         } | |
|       } | |
|     } | |
|   } | |
| } | |

The syntax element scaling_list_pred_mode_flag[scalingListId] being 0 indicates that the values of the scaling list are the same as the values of a reference scaling list. The reference scaling list is specified by scaling_list_pred_scaling_list_id_delta[scalingListId]. The syntax element scaling_list_pred_mode_flag[scalingListId] being 1 indicates that the values of the scaling list are explicitly signaled.

The syntax element scaling_list_predictor_mode_flag [scalingListId] being 1 indicates that the values of the scaling list can be predicted from a reference scaling list that is specified by scaling_list_pred_scaling_list_id_delta [scalingListId]. The syntax element scaling_list_predictor_mode_flag [scalingListId] being 0 specifies that the values of the scaling list are explicitly signaled. When not present, the value of scaling_list_predictor_mode_flag [scalingListId] is inferred to be equal to 0.

The syntax element scaling_list_dc_coef_minus8[scalingListId] plus 8+predDC specifies the DC value of the current scaling list being determined, denoted as ScalingFactorDC[sizeId] [matrixId] or ScalingFactorDC [scalingListId]. In some embodiments, the value of scaling_list_dc_coef_minus8 [scalingListId] is constrained to be in the range of −7 to 247, inclusive. If scaling_list_predictor_mode_flag [scalingListId] is equal to 1, and scaling_list_pred_scaling_list_id_delta[scalingListId] is equal to 0, predDC is equal to 16; otherwise, if scaling_list_predictor_mode_flag[matrixId] is equal to 1, predDC is equal to ScalingMatrix [refSizeId][refMatrixId][0][0]; otherwise, predDC is equal to 0. If scaling_list_pred_mode_flag[scalingListId] is equal to 0, scalingListId is larger than 15, and scaling_list_pred_scaling_list_id_delta [scalingListId] is equal to 0, the value of ScalingFactorDC[sizeId][matrixId] is set as 16. Otherwise, if scaling_list_pred_mode_flag[scalingListId] is equal to 0, scalingListId is larger than 15, and scaling_list_pred_scaling_list_id_delta [scalingListId] is not equal to 0, the value of ScalingFactorDC[sizeId][matrixId] is set equal to ScalingFactorDC[refSizeId][refMatrixId].

The syntax element scaling_list_delta_coef specifies the difference between the current matrix coefficient ScalingList [scalingListId][i] and the previous matrix coefficient ScalingList[scalingListId][i−1], when scaling_list_pred_mode_flag[scalingListId] is equal to 1. The value of scaling_list_delta_coef is constrained to be in the range of −128 to 127, inclusive. The value of ScalingList [scalingListId][i] is greater than 0. When scaling_list_pred_mode_flag [scalingListId] is equal to 1 and scaling_list_delta_coef is not present, the value of ScalingList[scalingListId][i] is inferred to be 0.

If scaling_list_pred_mode_flag[scalingListId] is equal to 1, the array ScalingMatrix[scalingListId] is derived as follows:

```
ScalingMatrix[sizeId][ matrixId ][ i ][ j ] =
  ScalingList[scalingListId][ k ] +
(scaling_list_predictor_mode_flag[ scalingListId ]) ?
((scaling_list_pred_scaling_list_id_delta[scalingListId] = = 0) ? 16 :
ScalingList[ refScalingListId ][ i ]) : 0
  with k = 0 .. coefNum − 1,
  i = diagScanOrder[ log2(coefNum)/2 ][ log2(coefNum)/2 ][ k ][ 0 ], and
  j = diagScanOrder[ log2(coefNum)/2 ][ log2(coefNum)/2 ][ k ][ 1 ]
```

In some embodiments, when ChromaArrayType is equal to 3, the elements of the chroma quantization matrix of size 64×64, ScalingFactor[6][6][matrixId][x][y], x=0 . . . 63, y=0 . . . 63, and matrixId=1, 2, 4 and 5 are derived as follows:

```
ScalingFactor[6][6][matrixId][x][y] =
  ScalingFactor[5][5][ matrixId ][ i ][ j ]
  with i = x and j = y
```

Table 7 illustrates another alternate syntax for signaling scaling lists of a video picture or sequence based on the 1D indexing scheme, in which the syntax element "scalingListId" is simply referred to as "id" and the ranges defined for the scaling list indices are modified.

TABLE 7

| | Descriptor |
|---|---|
| scaling_list_data( ) { | |
|   scaling_matrix_for_lfnst_disabled_flag | u(1) |
|   for( id = 0; id < 28; id ++ ) | |
|     matrixSize = (id < 2 ) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|       scaling_list_pred_mode_flag[ id ] | u(1) |
|     if( ( scaling_list_copy_mode_flag[ id ] | | | |
|       scaling_list_pred_mode_flag | |
|   [ id ] ) && | |
|       id != 0 && id != 2 && id != 8 ) | |
|       scaling_list_pred_id_delta[ id ] | ue(v) |
|     if( !scaling_list_copy_mode_flag[ id ] ) { | |
|       nextCoef = 0 | |
|       if( id > 13 ) { | |
|         scaling_list_dc_coef[ id − 14 ] | se(v) |
|         nextCoef = nextCoef + scaling_list_dc_coef | |
|         [id − 14 ] | |
|       } | |
|       for( i = 0; i < matrixSize * matrixSize; i++ ) { | |
|         x = DiagScanOrder[ 3 ][ 3 ][ i ][ 0 ] | |
|         y = DiagScanOrder[ 3 ][ 3 ][ i ][ 1 ] | |
|         if( !( id > 25 && x >= 4 && y >= 4 ) ) { | |
|           scaling_list_delta_coef | se(v) |
|           nextCoef = nextCoef + scaling_list_delta_coef | |
|         } | |
|         ScalingList[ id ][ i ] = nextCoef | |
|       } | |
|     } | |
|   } | |
| } | |

The syntax element scaling_matrix_for_ifnst_disabled_flag being 1 specifies that scaling matrices are not applied to blocks coded with LFNST, being 0 specifies that the scaling matrices may apply to the blocks coded with LFNST.

The syntax element scaling_list_copy_mode_flag[id] being 1 specifies that the values of the scaling list are the same as the values of a reference scaling list. The reference scaling list is specified by scaling_list_pred_id_delta[id]. The syntax element scaling_list_copy_mode_flag[id] being 0 specifies that scaling_list_pred_mode_flag is present.

The syntax element scaling_list_pred_mode_flag[id] being 1 specifies that the values of the scaling list can be predicted from a reference scaling list. The reference scaling list is specified by scaling_list_pred_id_delta[id]. scaling_list_pred_mode_flag[id] being 0 specifies that the values of the scaling list are explicitly signaled. When not present, the value of scaling_list_pred_mode_flag[id] is inferred to be equal to 0.

The syntax element scaling_list_pred_id_delta[id] specifies the reference scaling list used to derive a predicted scaling matrix ScalingMatrixPred[id]. When not present, scaling_list_pred_id_delta[id] is inferred to be 0. The value of scaling_list_pred_id_delta[id] is constrained to be in the range of 0 to maxIdDelta with maxIdDelta derived depending on id as:

maxIdDelta=(id<2)?id:((id<8)?(id−2):(id−8))

The variables refId and matrixSize are derived as follows:

```
refId = id - scaling_list_pred_id_delta[ id ]
matrixSize = ( id < 2 ) ? 2 : ( ( id < 8 ) ? 4 : 8 )
```

The (matrixSize)×(matrixSize) array ScalingMatrixPred [x][y] with x=0 . . . matrixSize−1, y=0 . . . matrixSize−1.

The variable ScalingMatrixDCPred are derived as follows: When both scaling_list_copy_mode_flag[id] and scaling_list_pred_mode_flag [id] are equal to 0, all elements of ScalingMatrixPred are set to 8, and the value of ScalingMatrixDCPred is set to 8. Otherwise, when scaling_list_pred_id_delta[id] is equal to 0, all elements of ScalingMatrixPred are set equal to 16, and ScalingMatrixDCPred is set to 16. Otherwise (either scaling_list_copy_mode_flag[id] or scaling_list_pred_mode_flag[id] is equal to 1 and scaling_list_pred_id_deta[id] is greater than 0), ScalingMatrixPred is set equal to ScalingMatrix [refId]. If refId is greater than 13, ScalingMatrixDCPred is set equal to ScalingMatrixDC [refId−14]. Otherwise (refId is less than or equal to 13), ScalingMatrixDCPred is set equal to ScalingMatrixPred[0][0].

The syntax element scaling_list_dc_coef[id−14] is used to derive the value of the variable ScalingMatrixDC[id−14] when id is greater than 13:

```
ScalingMatrixDC[ id − 14 ] = ScalingMatrixDCPred
    +scaling_list_dc_coef [ id − 14 ] + 256, or
ScalingMatrixDC[ id − 14 ] = (ScalingMatrixDCPred
    +scaling_list_dc_coef [ id − 14 ] + 256)%256
```

In some embodiments, the value of scaling_list_dc_coef [id−14] is constrained to be in the range of −254 to 254, inclusive. When not present, the value of scaling_list_dc_coef[id−14] is inferred to be equal to 0. In some embodiments, the value of ScalingMatrixDC[id−14] is constrained to be in the range of 1 to 255, inclusive. In some other embodiments, the value of scaling_list_dc_coef [id−14] is constrained to be in the range of −128 to −127, inclusive. When not present, the value of scaling_list_dc_coef[id−14] is inferred to be equal to 0. In some embodiments, the value of ScalingMatrixDC[id−14] is constrained to be greater than 0.

The syntax element scaling_list_delta_coef specifies the difference between the current matrix coefficient ScalingList [id][i] and the previous matrix coefficient ScalingList[id][i−1], when scaling_list_copy_mode_flag[id] is equal to 0. In some embodiments, value of scaling_list_delta_coef is constrained to be in the range of −511 to 511, inclusive. In some embodiments, value of scaling_list_delta_coef is constrained to be in the range of −128 to 127, inclusive. When scaling_list_copy_mode_flag [id] is equal to 1, all elements of ScalingList[id] are set equal to 0.

ScalingMatrix [id] is a (matrixSize)×(matrixSize) array that is derived as follows:

```
ScalingMatrix [ id ][ x ][ y ] = ScalingMatrixPred[ x ][ y ] +
ScalingList[ id ][ k ], with k = 0..( matrixSize * matrixSize − 1 ), or
    ScalingMatrix [ id ][ x ][ y ] = (ScalingMatrixPred[ x ][ y ] +
    Scaling List[ id ][ k ]+256)%256, with k = 0..( matrixSize *
matrixSize − 1),
    x = DiagScanOrder[ Log2( matrixSize ) ][ Log2( matrixSize ) ]
    [ k ][ 0 ],
    y = DiagScanOrder[ Log2( matrixSize ) ][ Log2( matrixSize ) ]
    [ k ][ 1 ],
```

-continued

```
The value of ScalingMatrix [ id ][ x ][ y ] shall be in the range of
    1 to 255,
inclusive. In some other embodiments, the value of ScalingMatrix
    [ id ][ x ][ y ]
shall be greater than zero.
```

In some embodiments, if scaling_list_delta_coef and scaling_list_dc_coef are signaled as the difference between the predictor and the original data, the range of scaling_list_delta_coef and scaling_list_dc_coef can be designed based on the predictor bit-depth or a pre-defined range, e.g. [−255, 255], [−254,254], [−128,128], [−255,254], [−512,511], or [−511,511]. In some embodiments, the range of scaling_list_delta_coef and scaling_list_dc_coef can be constrained by modulus operation. For example, if the value of the predictor is 8, the range of scaling_list_delta_coef and scaling_list_dc_coef is set to be [−7,247]; otherwise, if the value of the predictor is 16, the range of scaling_list_delta_coef and scaling_list_dc_coef is set to be [−15,239]; otherwise, if the value of the predictor has 8 bits in bit-depth, the range of scaling_list_delta_coef and scaling_list_dc_coef is set to be [−512, 511].

In some embodiments, the pre-defined range of scaling_list_delta_coef and scaling_list_dc_coef can be used to derive the range of final scaling matrices coefficients. In some embodiments, the range of scaling_list_delta_coef and scaling_list_dc_coef can be explicitly signaled to the decoder at sequence level, picture level, or slice level. In some embodiments, if a coefficient in a final scaling matrix is overflow compared to a pre-defined range, e.g. 8 bits, 10 bits, or internal bit-depth, the overflow coefficient will be set to a pre-defined default value, e.g. 16, 8, before signaling. In some embodiments, if a coefficient in a final scaling matrix is overflow compared to a pre-defined range, e.g. 8 bits, 10 bits, or internal bit-depth, the corresponding scaling matrix will be set to all flat with a pre-defined default value, ex. 16, 8 before signaling.

In some embodiments, if scaling_list_delta_coef and scaling_list_dc_coef are signaled as the difference between the predictor and the original data, the range of scaling_list_delta_coef and scaling_list_dc_coef can be further constrained in a pre-defined range, e.g. [−255, 255], [−254, 254], [−127, 127], [−128,127], [−256, 255], [−512, 511], or [−511, 511]. In some embodiments, the range of scaling_list_delta_coef and scaling_list_dc_coef can be constrained by modulus operation. In some embodiments, the range of intermediate parameters, e.g., nextCoef, can be further constrained by modulus operation, e.g. Modulus by 256, to make sure the bit-depth of final scaling matrices coefficients are within a pre-defined range. In some embodiments, the range of scaling_list_delta_coef, scaling_list_dc_coef and nextCoef can be constrained by modulus operation, e.g., Modulus by 256. As such, the signaled scaling_list_delta_coef and scaling_list_dc_coef can be constrained in a smaller range, e.g., [−128, 127], [−127, 127]. In some embodiments, the pre-defined range of scaling_list_delta_coef and scaling_list_dc_ coef or intermediate parameters, e.g., nextCoef, can be used to derive the bit-depth of final scaling matrices coefficients.

E. Signaling Scaling Matrices

Figure 5:
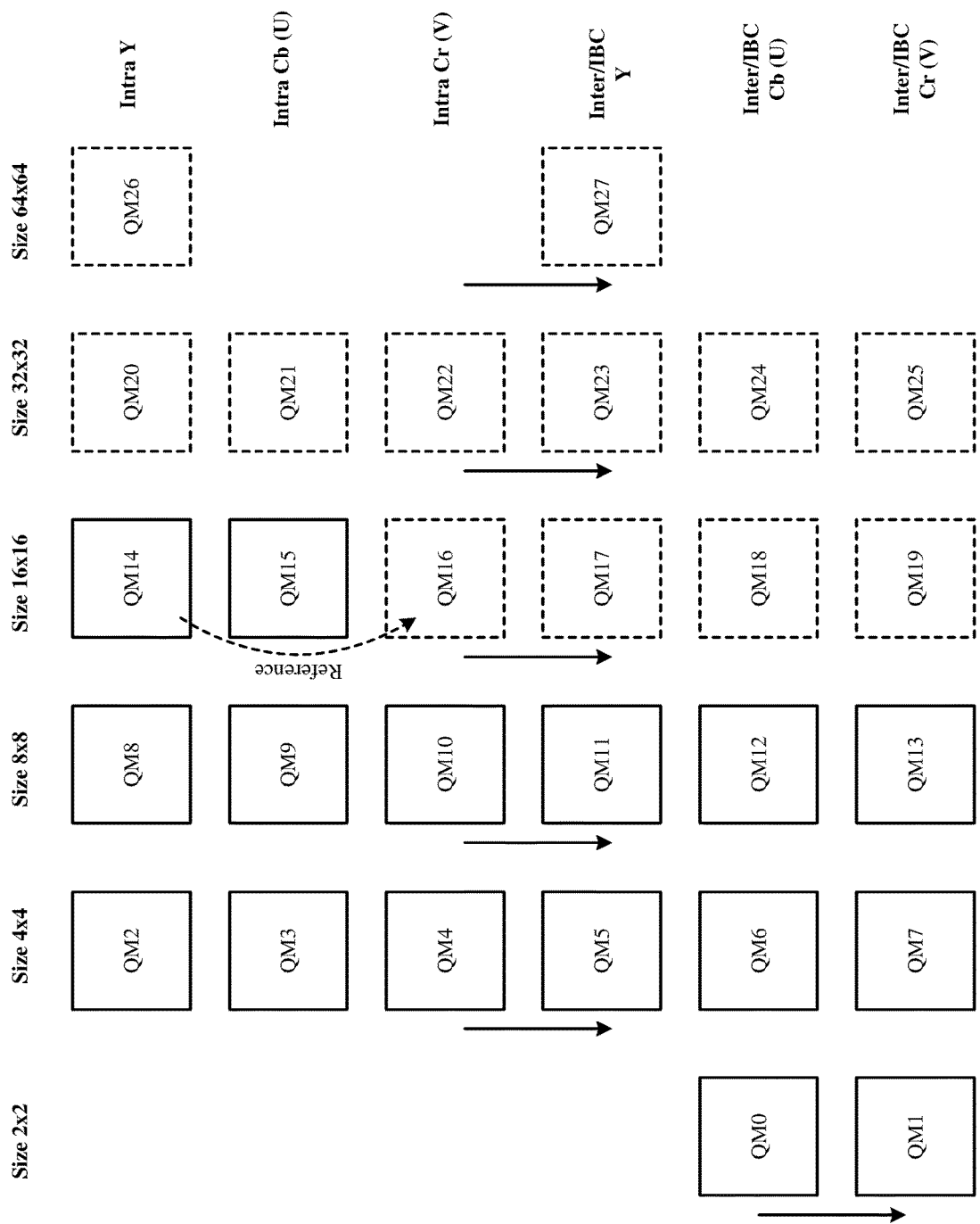
FIG. 5 conceptually illustrates scaling matrices (or scaling lists or quantization matrices) that are determined by referencing previously coded or signaled scaling matrices.

FIG. 5 conceptually illustrates scaling matrices (or scaling lists or quantization matrices) that are determined by referencing previously coded or signaled scaling matrices. The figure illustrates example scaling matrices QM0 through QM27 that are to be used for quantizing or dequantizing the transform coefficients of a video picture. The different scaling matrices are designated for transform blocks of different types, e.g., different block sizes (2, 4, 8, 16, 32, 64), different color components (luma and chroma), and/or different prediction modes (Inter/Intra).

The scaling matrices QM0 through QM27 are also referred to as basis or base scaling matrices, since they are signaled in a bitstream and serve as basis for deriving the actual quantization matrices used for quantizing or dequantizing a transform block (by e.g., up-sampling or down-sampling).

The figure illustrates the signaling of the scaling matrices QM0 through QM27. An encoder provides signals that encode the scaling matrices QM0 through QM27 in a bitstream. The decoder receives the signals from the bitstream and reconstructs each scaling matrices based on the received signals. In the example, the scaling matrices QM0 through QM15 have already been signaled or reconstructed, while the scaling matrices QM16 through QM27 have yet to be signaled or reconstructed.

A video encoder may signal (or a decoder may reconstruct) the content of a scaling matrix by referencing a previously signaled (or reconstructed) scaling matrix as predictor. In the example, the video encoder signals (or decoder reconstructs) the content of the scaling matrix QM16 by referencing the content of the scaling matrix QM14. In some embodiments, the scaling matrix QM14 is a perfect predictor of the scaling matrix QM16 so that the video encoder may signal (or the video decoder may reconstruct) QM16 by copying or replicating the elements of QM14 without applying delta values. If QM14 is not a perfect predictor of QM16, the video encoder may signal additional delta values between corresponding elements of QM14 and QM16.

In some embodiments, the decoder may identify the reference or predictor scaling matrix by applying a reference index offset to the index of the scaling matrix being reconstructed. The reference index offset may be a syntax element in the bitstream (e.g., scaling_list_pred_scaling_list_id_delta.) In the example of FIG. 5, the index of the scaling matrix being reconstructed is 16 (QM16) and the index of the scaling matrix being referenced is 14 (QM14). The the reference index offset has value of "2" for QM16, which is used to derive the index of the QM14 from the index of QM16.

In this example, the referenced scaling matrix QM14 has a same size as the to-be-coded scaling matrix QM16. In some embodiments, when referencing a previously coded or signaled scaling matrix as predictor for determining a current to-be-coded scaling matrix, the referenced scaling matrix must be the same size as the current scaling matrix. Thus, for the example of FIG. 5, QM16 may reference QM15 and QM14 (size 16×16), but not QM13 (size 8×8). Furthermore, when signaling a scaling matrix that is the first to be signaled according to the 1D indexing scheme (e.g., QM14 which is the first scaling matrix of size 16×16 being signaled), previously coded scaling matrices (such as QM13) cannot be used as reference (since they have different sizes), and the reference index offset is always 0.

Any of the foregoing proposed methods can be implemented in various hardware, software realizations of encoders and/or decoders, or a combination of thereof. For example, an embodiment of the present invention can be one or more circuits integrated into a video compression chip or program code integrated into video compression software to perform the processing described herein. For example, any of the proposed methods can be implemented as a circuit coupled to a quantization module and an inverse quantization module of the encoder, and can be implemented as a circuit coupled to an inverse quantization module of the decoder. In one embodiment, any of the proposed methods can be implemented in a quantization module and an inverse quantization module of an encoder, and can be implemented in an inverse quantization module of a decoder.

II. Example Video Encoder

Figure 6:
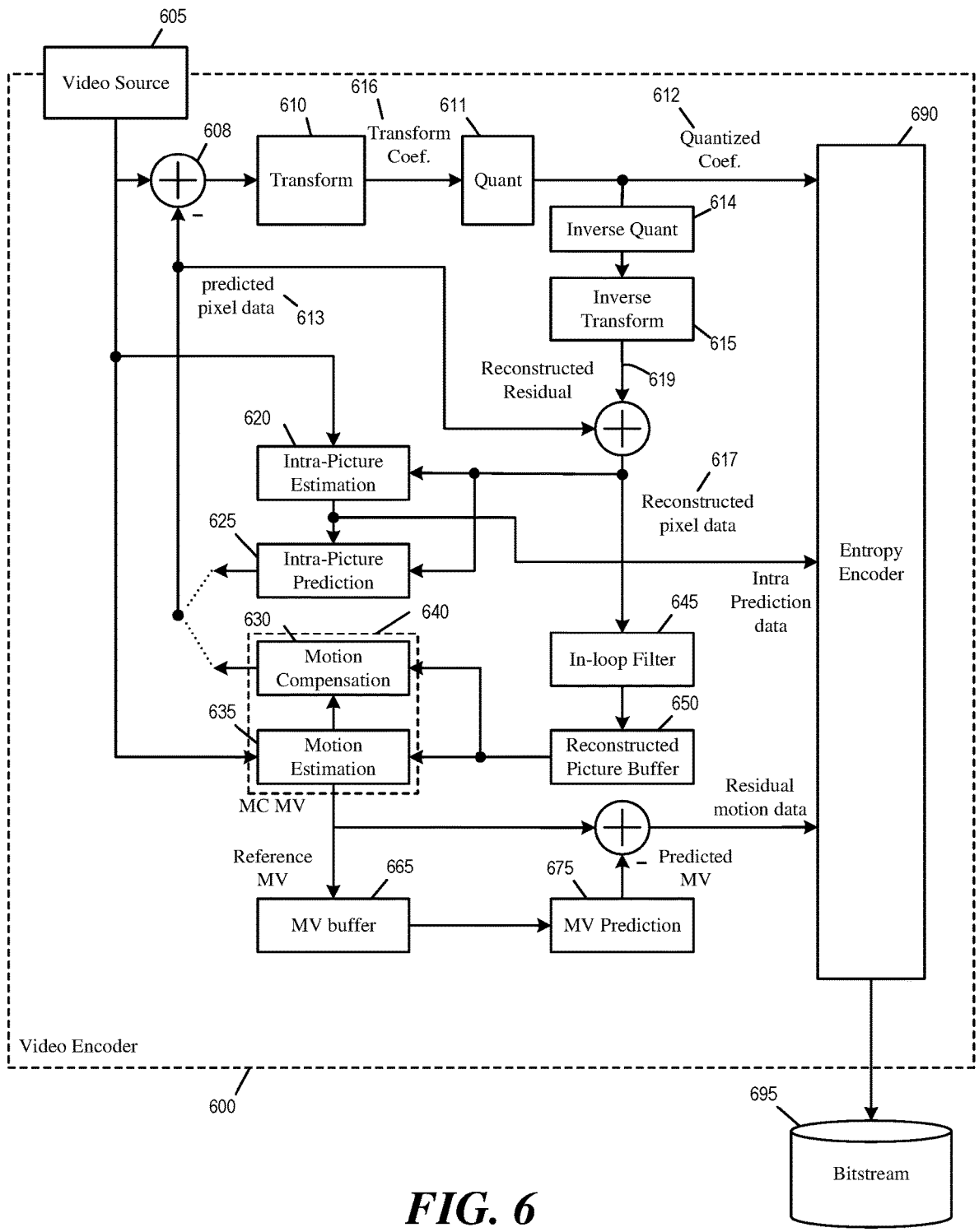
FIG. 6 illustrates an example video encoder.

FIG. 6 illustrates an example video encoder 600. As illustrated, the video encoder 600 receives input video signal from a video source 605 and encodes the signal into bitstream 695. The video encoder 600 has several components or modules for encoding the signal from the video source 605, at least including some components selected from a transform module 610, a quantization module 611, an inverse quantization module 614, an inverse transform module 615, an intra-picture estimation module 620, an intra-prediction module 625, a motion compensation module 630, a motion estimation module 635, an in-loop filter 645, a reconstructed picture buffer 650, a MV buffer 665, and a MV prediction module 675, and an entropy encoder 690. The motion compensation module 630 and the motion estimation module 635 are part of an inter-prediction module 640.

In some embodiments, the modules 610-690 are modules of software instructions being executed by one or more processing units (e.g., a processor) of a computing device or electronic apparatus. In some embodiments, the modules 610-690 are modules of hardware circuits implemented by one or more integrated circuits (ICs) of an electronic apparatus. Though the modules 610-690 are illustrated as being separate modules, some of the modules can be combined into a single module.

The video source 605 provides a raw video signal that presents pixel data of each video frame without compression. A subtractor 608 computes the difference between the raw video pixel data of the video source 605 and the predicted pixel data 613 from the motion compensation module 630 or intra-prediction module 625. The transform module 610 converts the difference (or the residual pixel data or residual signal 609) into transform coefficients (e.g., by performing Discrete Cosine Transform, or DCT). The quantization module 611 quantizes the transform coefficients into quantized data (or quantized coefficients) 612, which is encoded into the bitstream 695 by the entropy encoder 690.

The inverse quantization module 614 de-quantizes the quantized data (or quantized coefficients) 612 to obtain transform coefficients, and the inverse transform module 615 performs inverse transform on the transform coefficients to produce reconstructed residual 619. The reconstructed residual 619 is added with the predicted pixel data 613 to produce reconstructed pixel data 617. In some embodiments, the reconstructed pixel data 617 is temporarily stored in a line buffer (not illustrated) for intra-picture prediction and spatial MV prediction. The reconstructed pixels are filtered by the in-loop filter 645 and stored in the reconstructed picture buffer 650. In some embodiments, the reconstructed picture buffer 650 is a storage external to the video encoder 600. In some embodiments, the reconstructed picture buffer 650 is a storage internal to the video encoder 600.

The intra-picture estimation module 620 performs intra-prediction based on the reconstructed pixel data 617 to produce intra prediction data. The intra-prediction data is provided to the entropy encoder 690 to be encoded into bitstream 695. The intra-prediction data is also used by the intra-prediction module 625 to produce the predicted pixel data 613.

The motion estimation module 635 performs inter-prediction by producing MVs to reference pixel data of previously decoded frames stored in the reconstructed picture buffer 650. These MVs are provided to the motion compensation module 630 to produce predicted pixel data.

Instead of encoding the complete actual MVs in the bitstream, the video encoder 600 uses MV prediction to generate predicted MVs, and the difference between the MVs used for motion compensation and the predicted MVs is encoded as residual motion data and stored in the bitstream 695.

The MV prediction module 675 generates the predicted MVs based on reference MVs that were generated for encoding previously video frames, i.e., the motion compensation MVs that were used to perform motion compensation. The MV prediction module 675 retrieves reference MVs from previous video frames from the MV buffer 665. The video encoder 600 stores the MVs generated for the current video frame in the MV buffer 665 as reference MVs for generating predicted MVs.

The MV prediction module 675 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 695 by the entropy encoder 690.

The entropy encoder 690 encodes various parameters and data into the bitstream 695 by using entropy-coding techniques such as context-adaptive binary arithmetic coding (CABAC) or Huffman encoding. The entropy encoder 690 encodes various header elements, flags, along with the quantized transform coefficients 612, and the residual motion data as syntax elements into the bitstream 695. The bitstream 695 is in turn stored in a storage device or transmitted to a decoder over a communications medium such as a network.

The in-loop filter 645 performs filtering or smoothing operations on the reconstructed pixel data 617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 7:
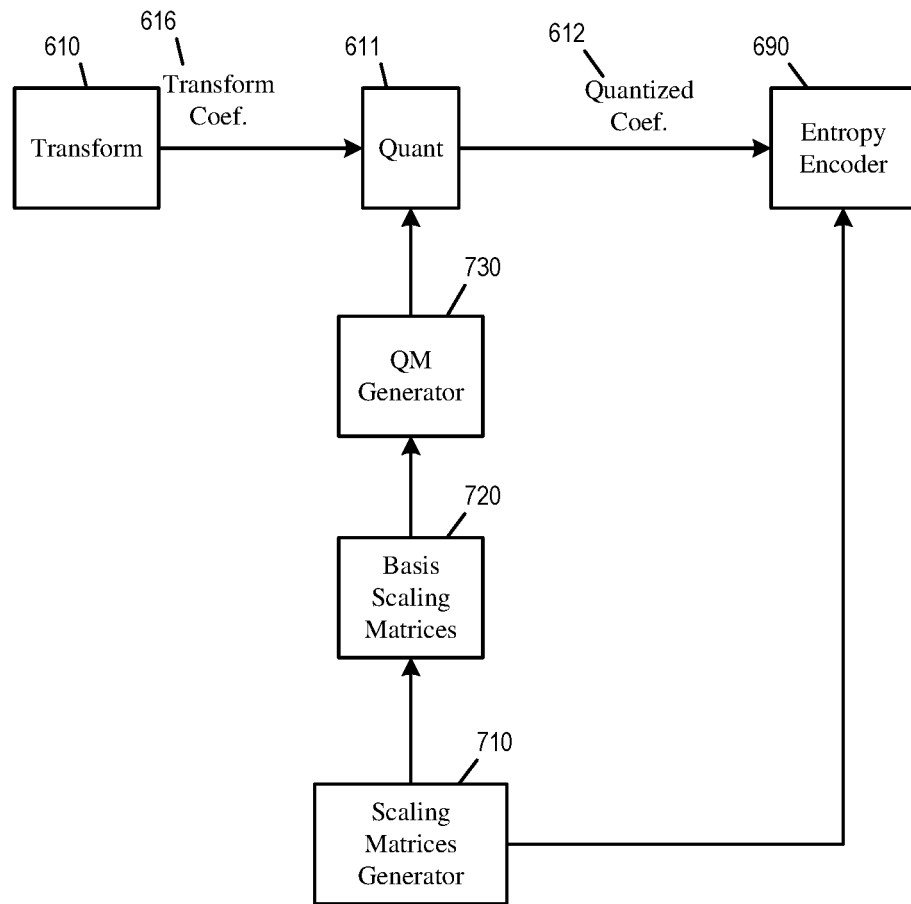
FIG. 7 illustrates portions of the video encoder that implement the signaling of scaling matrices.

FIG. 7 illustrates portions of the video encoder 600 that implement the signaling of scaling matrices. As illustrated, the quantization module 611 uses a quantization matrix to quantize transform coefficients 616. The quantization matrix is provided by a quantization matrix generator 730. The quantization matrix generator 730 generates the quantization matrix for the current transform block based on a set of basis scaling matrices 720, by e.g., selecting a basis scaling matrix and performing down-sampling or up-sampling on the selected basis scaling matrix to generate a quantization matrix that matches the size of the current transform block.

The set of basis scaling matrices 720 are determined or constructed by a scaling matrices generator 710 for the current picture or the current sequence of pictures, for transform blocks of different sizes, different color components, and different prediction modes. The scaling matrices generator 710 also provides signals that can be used to construct the scaling matrices to the entropy encoder 690 to be included in the bitstream 695.

The scaling matrices generator 710 generates the scaling matrices 720. The scaling matrices generator 710 may reference a default scaling matrix when generating the coefficients of a scaling matrix. The scaling matrices generator 710 may also generate a scaling matrix by prediction or copying. Specifically, the scaling matrices generator may signal a reference scaling matrix (or predictor, e.g., QM16 referencing QM14 in FIG. 5) by providing to the entropy encoder 690, a reference index offset (e.g., scaling_list_pred_scaling_list_id_delta) that can be used to identify a previously coded or signaled scaling matrix as the reference or predictor scaling matrix. The matrices generator 790 may also provide to the entropy encoder 690 a flag indicating whether the predictor scaling matrix is to be copied or serve as basis for prediction, along with delta values between the predictor scaling matrix and the current scaling matrix.

Figure 8:
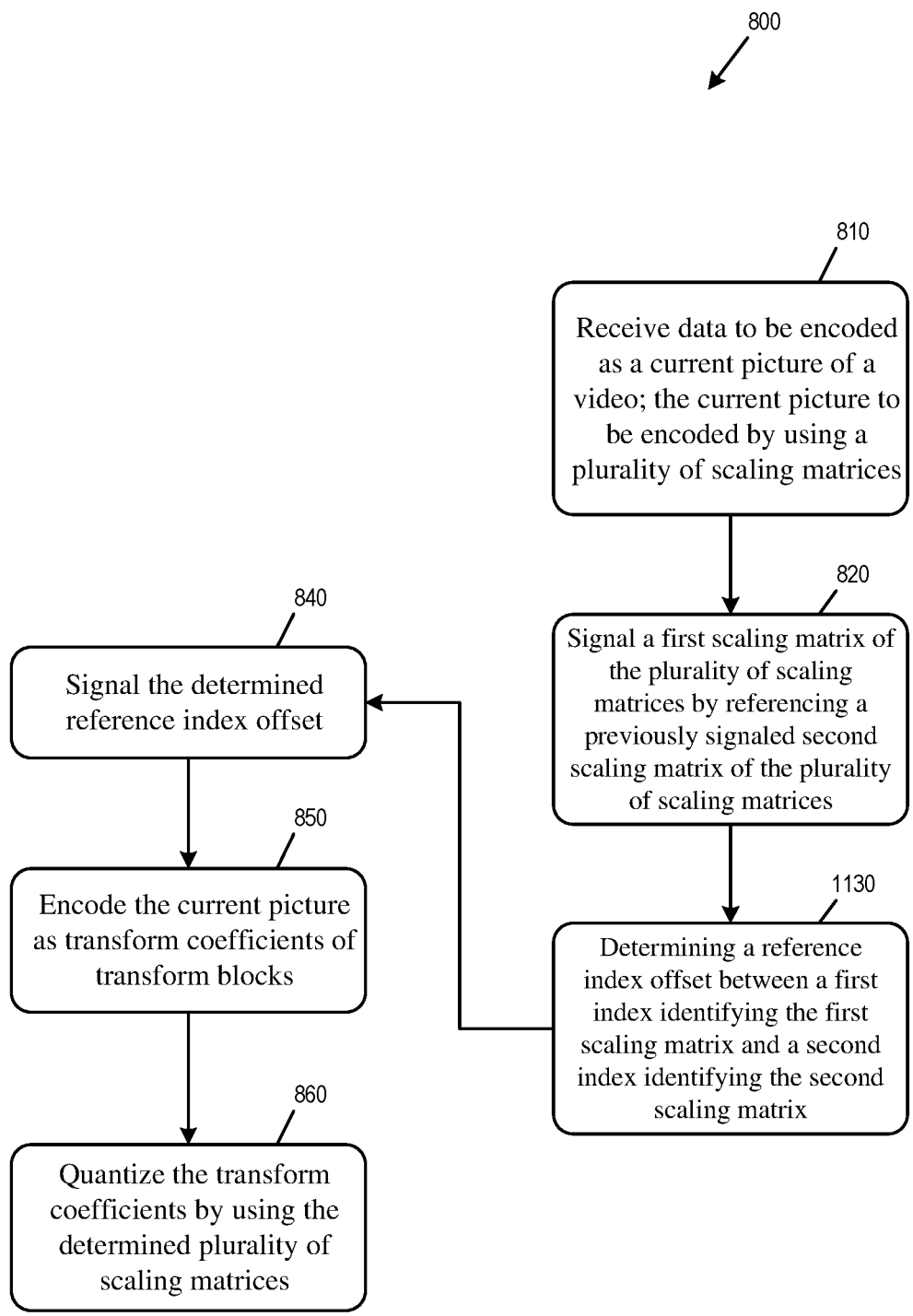
FIG. 8 conceptually illustrates a process for signaling scaling matrices for encoding a video picture.

FIG. 8 conceptually illustrates a process 800 for signaling scaling matrices for encoding a video picture. In some embodiments, one or more processing units (e.g., a processor) of a computing device implements the encoder 600 performs the process 800 by executing instructions stored in a computer readable medium.

In some embodiments, an electronic apparatus implementing the encoder 600 performs the process 800.

The encoder receives (at block 810) data from a bitstream to be encoded as a current picture of a video. The current picture is to be encoded by using a plurality of scaling matrices.

The encoder signals (at block 820) a first scaling matrix of the plurality of scaling matrices by referencing a previously signaled second scaling matrix of the plurality of scaling matrices. In some embodiments when a first flag (e.g., scaling_list_copy_mode_flag) in the bitstream indicates that corresponding elements of the first and second scaling matrices are identical, the first scaling matrix is determined by replicating the elements of the second scaling matrix as the elements of the first scaling matrix. In some embodiments, when the first flag in the bitstream indicates that corresponding elements of the first and second scaling matrices are not identical, a second flag (e.g., scaling_list_prediction_mode_flag) in the bitstream indicates whether the first scaling matrix is determined by (i) adding a set of delta values to the elements of the second scaling matrix as elements of the first scaling matrix or (ii) explicit signaling in the bitstream.

The encoder determines (at block 830) a reference index offset (e.g., scaling_list_pred_scaling_list_id_delta) between a first index identifying the first scaling matrix and a second index identifying the second scaling matrix. The encoder signals (at block 840) the determined reference index offset. In some embodiments, the first and second indices are assigned to the first and second scaling matrices respectively according to a one-dimensional indexing scheme that assigns indices to scaling matrices according to their color components, block sizes, and prediction types. In some embodiments, scaling matrices for coding 2×2 transform blocks of chroma components for intra prediction type are not assigned indices according to the one-dimensional indexing scheme. In some embodiments, when no other scaling matrix of a same particular size as the first scaling matrix has been previously signaled for the current picture (e.g., when the index of the first scaling matrix is 0, 4, or 10 in the scheme of FIG. 3 or 2, 8, or 14 in the scheme of FIG. 4), the reference index offset is not signaled in the bitstream and the first scaling matrix is determined by referencing a default quantization matrix. In some embodiments, when the first index is greater than a threshold, the block size of the scaling matrix is 64.

The encoder encodes (at block 850) the current picture as transform coefficients of transform blocks. The encoder quantizes (at block 860) the transform coefficients by using the plurality of scaling matrices.

In some embodiments, the bitstream includes a first syntax element (e.g., scaling_list_delta_coef) that specifies a difference between two consecutive scaling matrix coefficients in the first matrix and a second syntax element (e.g., scaling_list_dc_coef) that specifies a DC coefficient of the first scaling matrix. The first and second syntax elements are constrained to be between −128 and 127, inclusive.

III. Example Video Decoder

Figure 9:
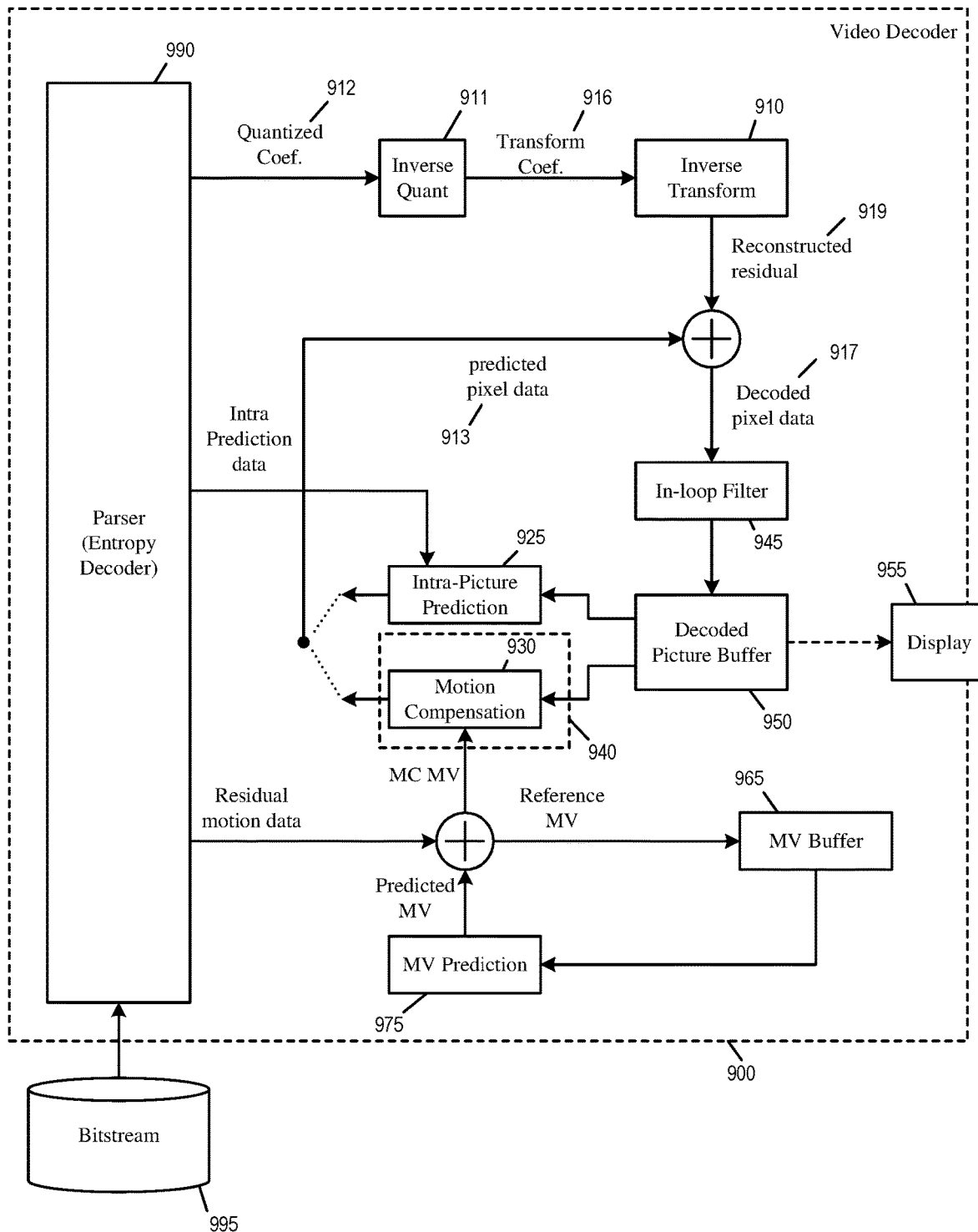
FIG. 9 illustrates an example video decoder.

FIG. 9 illustrates an example video decoder 900. As illustrated, the video decoder 900 is an image-decoding or video-decoding circuit that receives a bitstream 995 and decodes the content of the bitstream into pixel data of video frames for display. The video decoder 900 has several components or modules for decoding the bitstream 995, including some components selected from an inverse quantization module 911, an inverse transform module 910, an intra-prediction module 925, a motion compensation module 930, an in-loop filter 945, a decoded picture buffer 950, a MV buffer 965, a MV prediction module 975, and a parser 990. The motion compensation module 930 is part of an inter-prediction module 940.

In some embodiments, the modules 910-990 are modules of software instructions being executed by one or more processing units (e.g., a processor) of a computing device. In some embodiments, the modules 910-990 are modules of hardware circuits implemented by one or more ICs of an electronic apparatus. Though the modules 910-990 are illustrated as being separate modules, some of the modules can be combined into a single module.

The parser 990 (or entropy decoder) receives the bitstream 995 and performs initial parsing according to the syntax defined by a video-coding or image-coding standard. The parsed syntax element includes various header elements, flags, as well as quantized data (or quantized coefficients) 912. The parser 990 parses out the various syntax elements by using entropy-coding techniques such as context-adaptive binary arithmetic coding (CABAC) or Huffman encoding.

The inverse quantization module 911 de-quantizes the quantized data (or quantized coefficients) 912 to obtain transform coefficients, and the inverse transform module 910 performs inverse transform on the transform coefficients 916 to produce reconstructed residual signal 919. The reconstructed residual signal 919 is added with predicted pixel data 913 from the intra-prediction module 925 or the motion compensation module 930 to produce decoded pixel data 917. The decoded pixels data are filtered by the in-loop filter 945 and stored in the decoded picture buffer 950. In some embodiments, the decoded picture buffer 950 is a storage external to the video decoder 900. In some embodiments, the decoded picture buffer 950 is a storage internal to the video decoder 900.

The intra-prediction module 925 receives intra-prediction data from bitstream 995 and according to which, produces the predicted pixel data 913 from the decoded pixel data 917 stored in the decoded picture buffer 950. In some embodiments, the decoded pixel data 917 is also stored in a line buffer (not illustrated) for intra-picture prediction and spatial MV prediction.

In some embodiments, the content of the decoded picture buffer 950 is used for display. A display device 955 either retrieves the content of the decoded picture buffer 950 for display directly, or retrieves the content of the decoded picture buffer to a display buffer. In some embodiments, the display device receives pixel values from the decoded picture buffer 950 through a pixel transport.

The motion compensation module 930 produces predicted pixel data 913 from the decoded pixel data 917 stored in the decoded picture buffer 950 according to motion compensation MVs (MC MVs). These motion compensation MVs are decoded by adding the residual motion data received from the bitstream 995 with predicted MVs received from the MV prediction module 975.

The MV prediction module 975 generates the predicted MVs based on reference MVs that were generated for decoding previous video frames, e.g., the motion compensation MVs that were used to perform motion compensation. The MV prediction module 975 retrieves the reference MVs of previous video frames from the MV buffer 965. The video decoder 900 stores the motion compensation MVs generated for decoding the current video frame in the MV buffer 965 as reference MVs for producing predicted MVs.

The in-loop filter 945 performs filtering or smoothing operations on the decoded pixel data 917 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 10:
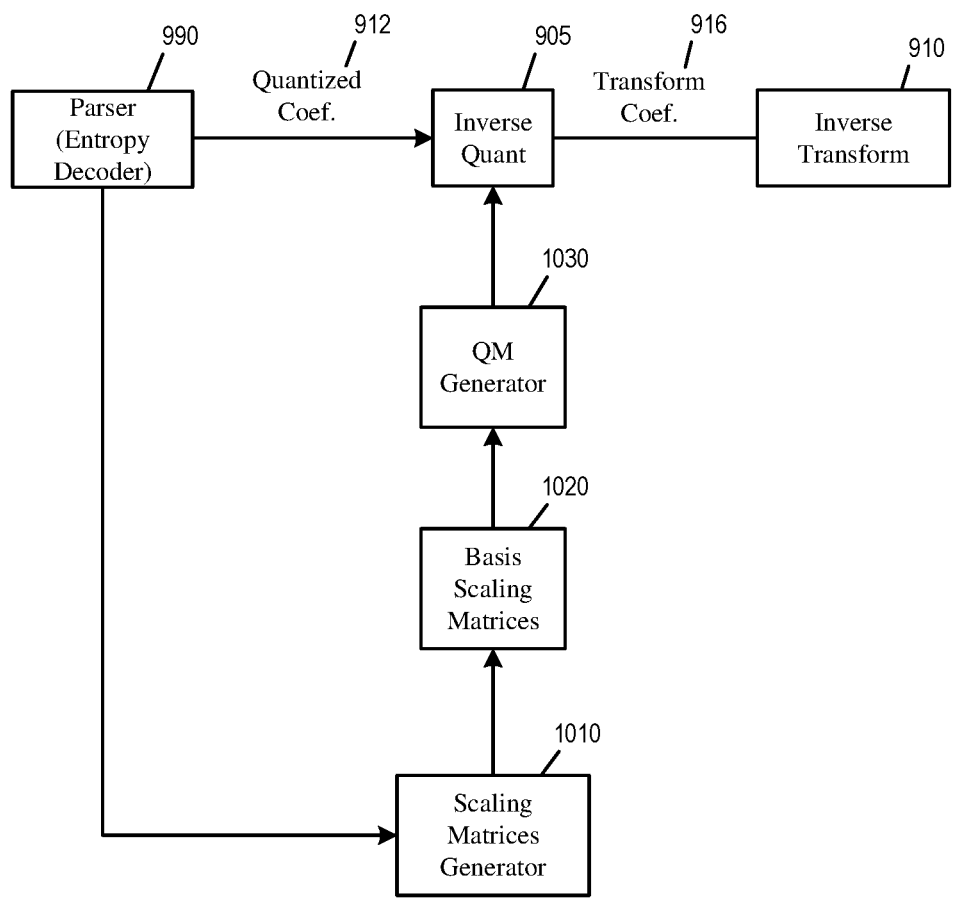
FIG. 10 illustrates portions of the video decoder that process the signaling of scaling matrices.

FIG. 10 illustrates portions of the video decoder 900 that process the signaling of scaling matrices. As illustrated, the de-quantization module 911 uses a quantization matrix to dequantize transform coefficients 916. The quantization matrix is provided by a quantization matrix generator 1030. The quantization matrix generator 1030 generates the quantization matrix for the current transform block based on a set of basis scaling matrices 1020, by e.g., selecting a basis scaling matrix and performing down-sampling or up-sampling on the selected basis scaling matrix to generate a quantization matrix that matches the size of current transform block.

The set of basis scaling matrices are determined or constructed by a scaling matrices generator 1010 for the current picture or the current sequence of pictures, for transform blocks of different sizes, different color components, and different prediction modes. The scaling matrices generator 1010 receives signals related to the scaling matrices parsed by the entropy decoder 990 from the bitstream 995.

The scaling matrices generator 1010 generates the scaling matrices 1020. The scaling matrices generator 1010 may reference a default scaling matrix when generating the coefficients of a scaling matrix. The scaling matrices generator 1010 may also generate a scaling matrix by prediction or copying. Specifically, the scaling matrices generator may identify a reference scaling matrix (or predictor, e.g., QM16 referencing QM14 in FIG. 5) by receiving from the entropy decoder 990, a reference index offset (e.g., scaling_list_pred_scaling_list_id_delta) that can be used to identify a previously coded or signaled scaling matrix as the reference or predictor scaling matrix. The matrices generator 1090 may also receive from the entropy decoder 990 a flag indicating whether the predictor scaling matrix is to be copied or serve as basis for prediction, along with delta values between the predictor scaling matrix and the current scaling matrix.

Figure 11:
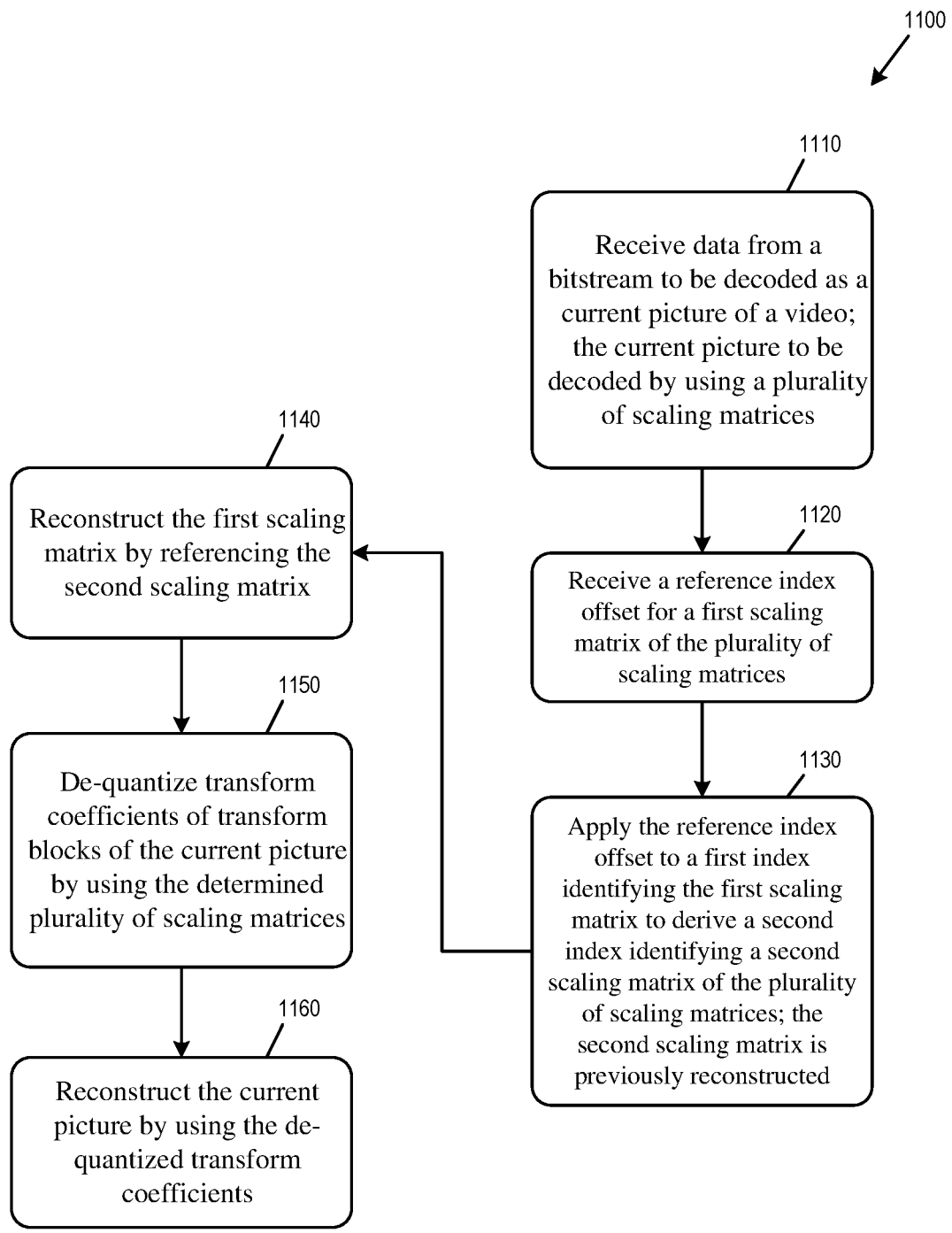
FIG. 11 conceptually illustrates a process for reconstructing scaling matrices for decoding a video picture.

FIG. 11 conceptually illustrates a process 1100 for reconstructing scaling matrices for decoding a video picture. In some embodiments, one or more processing units (e.g., a processor) of a computing device implements the decoder 900 performs the process 1100 by executing instructions stored in a computer readable medium. In some embodiments, an electronic apparatus implementing the decoder 900 performs the process 1100.

The decoder receives (at block 1110) data from a bitstream to be decoded as a current picture of a video. The current picture is to be decoded by using a plurality of scaling matrices.

The decoder receives (at block 1120) a reference index offset (e.g., scaling_list_pred_scaling_list_id_delta) for a first scaling matrix of the plurality of scaling matrices. The decoder applies (at block 1130) the reference index offset to a first index identifying the first scaling matrix to derive a second index identifying a second scaling matrix of the plurality of scaling matrices. The second scaling matrix is previously reconstructed. In some embodiments, the first and second indices are assigned to the first and second scaling matrices according to a one-dimensional indexing scheme that assigns indices to scaling matrices according to their color components, block sizes, and prediction types. In some embodiments, scaling matrices for coding 2×2 transform blocks of chroma components for intra prediction type are not assigned indices according to the one-dimensional indexing scheme. In some embodiments, when no other scaling matrix of a same particular size as the first scaling matrix has been previously signaled for the current picture (e.g., when the index of the first scaling matrix is 0, 4, or 10 in the scheme of FIG. 3 or 2, 8, or 14 in the scheme of FIG. 4), the reference index offset is not signaled in the bitstream and the first scaling matrix is determined by referencing a default quantization matrix. In some embodiments, when the first index is greater than a threshold, the block size of the scaling matrix is 64.

The decoder reconstructs (at block 1140) the first scaling matrix by referencing the second scaling matrix. In some embodiments when a first flag (e.g., scaling_list_copy_mode_flag) in the bitstream indicates that corresponding elements of the first and second scaling matrices are identical, the first scaling matrix is determined by replicating the elements of the second scaling matrix as the elements of the first scaling matrix. In some embodiments, when the first flag in the bitstream indicates that corresponding elements of the first and second scaling matrices are not identical, a second flag (e.g., scaling_list_prediction_mode_flag) in the bitstream indicates whether the first scaling matrix is determined by (i) adding a set of delta values to the elements of the second scaling matrix as elements of the first scaling matrix or (ii) explicit signaling in the bitstream.

The decoder dequantizes (at block 1150) transform coefficients of transform blocks of the current picture by using the plurality of scaling matrices. The decoder reconstructs (at block 1160) the current picture by using the dequantized transform coefficients.

In some embodiments, the bitstream includes a first syntax element (e.g., scaling_list_delta_coef) that specifies a difference between two consecutive scaling matrix coefficients in the first matrix and a second syntax element (e.g., scaling_list_dc_coef) that specifies a DC coefficient of the first scaling matrix. The first and second syntax elements are constrained to be between −128 and 127, inclusive.

IV. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 12:
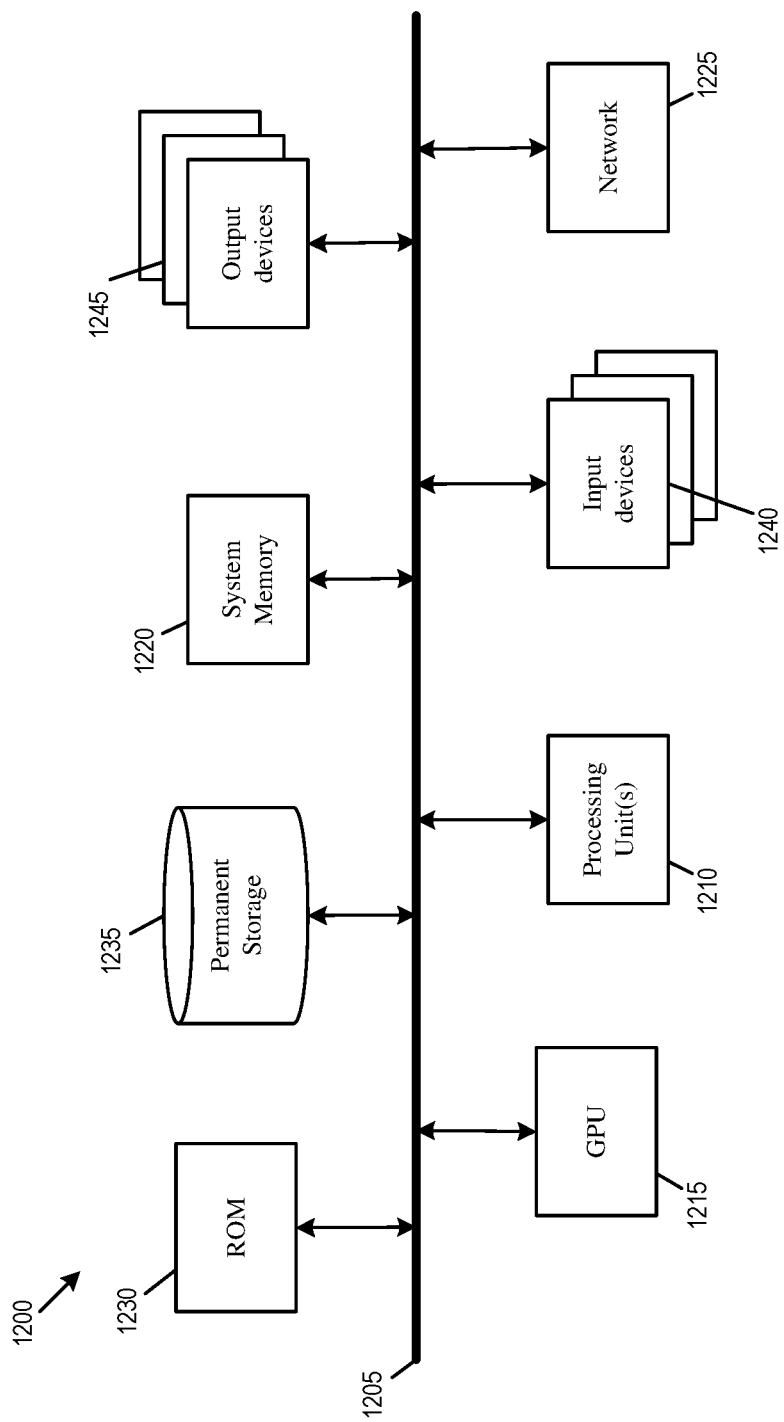
FIG. 12 conceptually illustrates an electronic system with which some embodiments of the present disclosure are implemented.

FIG. 12 conceptually illustrates an electronic system 1200 with which some embodiments of the present disclosure are implemented. The electronic system 1200 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1200 includes a bus 1205, processing unit(s) 1210, a graphics-processing unit (GPU) 1215, a system memory 1220, a network 1225, a read-only memory 1230, a permanent storage device 1235, input devices 1240, and output devices 1245.

The bus 1205 collectively represents all system, peripheral, and chipset buses that communicatively connect the numerous internal devices of the electronic system 1200. For instance, the bus 1205 communicatively connects the processing unit(s) 1210 with the GPU 1215, the read-only memory 1230, the system memory 1220, and the permanent storage device 1235.

From these various memory units, the processing unit(s) 1210 retrieves instructions to execute and data to process in order to execute the processes of the present disclosure. The processing unit(s) may be a single processor or a multi-core processor in different embodiments. Some instructions are passed to and executed by the GPU 1215. The GPU 1215 can offload various computations or complement the image processing provided by the processing unit(s) 1210.

The read-only-memory (ROM) 1230 stores static data and instructions that are used by the processing unit(s) 1210 and other modules of the electronic system. The permanent storage device 1235, on the other hand, is a read-and-write memory device. This device is a non-volatile memory unit that stores instructions and data even when the electronic system 1200 is off. Some embodiments of the present disclosure use a mass-storage device (such as a magnetic or optical disk and its corresponding disk drive) as the permanent storage device 1235.

Other embodiments use a removable storage device (such as a floppy disk, flash memory device, etc., and its corresponding disk drive) as the permanent storage device. Like the permanent storage device 1235, the system memory 1220 is a read-and-write memory device. However, unlike storage device 1235, the system memory 1220 is a volatile read-and-write memory, such a random access memory. The system memory 1220 stores some of the instructions and data that the processor uses at runtime. In some embodiments, processes in accordance with the present disclosure are stored in the system memory 1220, the permanent storage device 1235, and/or the read-only memory 1230. For example, the various memory units include instructions for processing multimedia clips in accordance with some embodiments. From these various memory units, the processing unit(s) 1210 retrieves instructions to execute and data to process in order to execute the processes of some embodiments.

The bus 1205 also connects to the input and output devices 1240 and 1245. The input devices 1240 enable the user to communicate information and select commands to the electronic system. The input devices 1240 include alphanumeric keyboards and pointing devices (also called "cursor control devices"), cameras (e.g., webcams), microphones or similar devices for receiving voice commands, etc. The output devices 1245 display images generated by the electronic system or otherwise output data. The output devices 1245 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 12, bus 1205 also couples electronic system 1200 to a network 1225 through a network adapter (not shown). In this manner, the computer can be a part of a network of computers (such as a local area network ("LAN"), a wide area network ("WAN"), or an Intranet, or a network of networks, such as the Internet. Any or all components of electronic system 1200 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 8 and FIG. 11) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video decoding method, comprising:
receiving data from a bitstream to be decoded as a current picture of a video, the current picture to be decoded by using a plurality of scaling matrices;
receiving a reference index offset for a first scaling matrix of the plurality of scaling matrices;
applying the reference index offset to a first index identifying the first scaling matrix to derive a second index identifying a second scaling matrix of the plurality of scaling matrices, wherein the second scaling matrix is previously reconstructed;
reconstructing the first scaling matrix by referencing the second scaling matrix;
dequantizing transform coefficients of transform blocks of the current picture by using the plurality of scaling matrices; and
reconstructing the current picture by using the dequantized transform coefficients.

2. The method of claim 1, wherein the first and second indices are assigned to the first and second scaling matrices respectively according to a one-dimensional indexing scheme that assigns indices to scaling matrices according to their color components, block sizes, and prediction types.

3. The method of claim 2, wherein scaling matrices for coding 2×2 transform blocks of chroma components for intra prediction type are not assigned indices according to the one-dimensional indexing scheme.

4. The method of claim 2, wherein when the first index is greater than a threshold, the first scaling matrix has a block size of 64.

5. The method of claim 1, wherein when a first flag in the bitstream indicates that corresponding elements of the first and second scaling matrices are identical, the first scaling matrix is determined by replicating the elements of the second scaling matrix as the elements of the first scaling matrix.

6. The method of claim 5, wherein when the first flag in the bitstream indicates that corresponding elements of the first and second scaling matrices are not identical, a second flag in the bitstream indicates whether the first scaling matrix is determined by (i) adding a set of delta values to the elements of the second scaling matrix as elements of the first scaling matrix or (ii) explicit signaling in the bitstream.

7. The method of claim 1, wherein the reference index offset is not signaled in the bitstream when no other scaling matrix of a same particular size as the first scaling matrix has been previously coded for the current picture.

8. The method of claim 7, wherein the first scaling matrix is determined by referencing a default quantization matrix.

9. The method of claim 1, wherein the reference index offset is not signaled in the bitstream when the first index is 0, 4, or 10.

10. The method of claim 1, wherein the reference index offset is not signaled in the bitstream when the first index is 2, 8, or 14.

11. The method of claim 1, wherein the bitstream comprises a first syntax element that specifies a difference between two consecutive scaling matrix coefficients in the first matrix and a second syntax element that specifies a DC coefficient of the first scaling matrix, the first and second syntax elements constrained to be between −128 and 127, inclusive.

12. An electronic apparatus, comprising:
a video decoder circuit configured to perform operations comprising:
receiving data from a bitstream to be decoded as a current picture of a video, the current picture to be decoded by using a plurality of scaling matrices;
receiving a reference index offset for a first scaling matrix of the plurality of scaling matrices;

applying the reference index offset to a first index identifying the first scaling matrix to derive a second index identifying a second scaling matrix of the plurality of scaling matrices, wherein the second scaling matrix is previously reconstructed;

reconstructing the first scaling matrix by referencing the second scaling matrix;

dequantizing transform coefficients of transform blocks of the current picture by using the plurality of scaling matrices; and reconstructing the current picture by using the dequantized transform coefficients.

13. A video encoding method, comprising:

receiving data to be encoded as a current picture of a video, the current picture to be encoded by using a plurality of scaling matrices;

signaling a first scaling matrix of the plurality of scaling matrices by referencing a previously signaled second scaling matrix of the plurality of scaling matrices;

determining a reference index offset between a first index identifying the first scaling matrix and a second index identifying the second scaling matrix;

signaling the determined reference index offset;

encoding the current picture as transform coefficients of transform blocks; and quantizing the transform coefficients by using the plurality of scaling matrices.

* * * * *